US010949083B2

(12) United States Patent
Castaneda et al.

(10) Patent No.: US 10,949,083 B2
(45) Date of Patent: *Mar. 16, 2021

(54) PROCESSING DEVICE HAVING A GRAPHICAL USER INTERFACE FOR INDUSTRIAL VEHICLE

(71) Applicant: Crown Equipment Corporation, New Bremen, OH (US)

(72) Inventors: Anthony T. Castaneda, Troy, OH (US); Jess D. Gilland, St. Marys, OH (US); Jonathan C. Ochenas, Mooresville, NC (US); Steven R. Pulskamp, New Bremen, OH (US); Adam M. Ruppert, Wapakoneta, OH (US); Philip W. Swift, Oakwood, OH (US); Timothy A. Wellman, Coldwater, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/562,881

(22) Filed: Sep. 6, 2019

(65) Prior Publication Data

US 2019/0391737 A1 Dec. 26, 2019

Related U.S. Application Data

(63) Continuation of application No. 15/210,049, filed on Jul. 14, 2016, now Pat. No. 10,430,073.
(Continued)

(51) Int. Cl.
*G06F 3/048* (2013.01)
*G06F 3/0488* (2013.01)
(Continued)

(52) U.S. Cl.
CPC .......... *G06F 3/04883* (2013.01); *B60K 35/00* (2013.01); *B60K 37/06* (2013.01);
(Continued)

(58) Field of Classification Search
CPC ...... G06F 3/04883; G06F 3/0488; G06F 3/02; G06F 3/0416; G06F 3/0482;
(Continued)

(56) References Cited

U.S. PATENT DOCUMENTS 3,010,595 A 11/1961 Stone
3,319,816 A 5/1967 Christenson
(Continued)

FOREIGN PATENT DOCUMENTS

CN 103631423 A 3/2014
CN 103748625 A 4/2014
(Continued)

OTHER PUBLICATIONS

Abou El Seoud, Mohamed; Final Office Action; U.S. Appl. No. 15/815,788; dated Nov. 14, 2019; United States Patent and Trademark Office; Alexandria, Virgina.
(Continued)

*Primary Examiner* — Pei Yong Weng
(74) *Attorney, Agent, or Firm* — Stevens & Showalter LLP

(57) ABSTRACT

A processing device having a graphical user interface includes a housing having a touch screen display that receives touch gesture commands from a vehicle operator. Still further, a set of controls is arranged on a front face of the housing. The set of controls include hardware control equivalents to the gesture commands recognized by the touch screen of the display. This allows industrial vehicle operators to wear gloves or other attire fitting for the task at hand, without undue interference interacting with the
(Continued)

graphical user interface. Also, redundant control, e.g., via gesture commands recognized by the touch screen of the display and corresponding controls in the user control section allow the vehicle operator to use which ever data input option is most convenient for convenience, workflow, etc.

20 Claims, 13 Drawing Sheets

Related U.S. Application Data

(60) Provisional application No. 62/193,840, filed on Jul. 17, 2015.

(51) Int. Cl.
| | | |
|---|---|---|
| *G06F 3/02* | (2006.01) | |
| *G06F 3/041* | (2006.01) | |
| *G06F 3/0482* | (2013.01) | |
| *G06F 3/0481* | (2013.01) | |
| *B66F 9/075* | (2006.01) | |
| *B60K 35/00* | (2006.01) | |
| *B60K 37/06* | (2006.01) | |

(52) U.S. Cl.
CPC .............. *B66F 9/0759* (2013.01); *G06F 3/02* (2013.01); *G06F 3/0416* (2013.01); *G06F 3/0482* (2013.01); *G06F 3/0488* (2013.01); *G06F 3/04817* (2013.01); *B60K 2370/145* (2019.05); *B60K 2370/1438* (2019.05)

(58) Field of Classification Search
CPC ..... G06F 3/04817; B60K 35/00; B60K 37/06; B60K 2370/145; B60K 2370/1438; B66F 9/0759
See application file for complete search history.

(56) References Cited

U.S. PATENT DOCUMENTS

| | | | |
|---|---|---|---|
| 3,410,433 | A | 11/1968 | Brown |
| 3,542,161 | A | 11/1970 | Ulinski |
| 3,854,820 | A | 12/1974 | Hansen |
| 3,937,339 | A | 2/1976 | Geis et al. |
| 4,062,269 | A | 12/1977 | Chichester et al. |
| 4,074,794 | A | 2/1978 | Scholl |
| 4,122,957 | A | 10/1978 | Allen et al. |
| 4,130,183 | A | 12/1978 | Tjornemark |
| 4,162,869 | A | 7/1979 | Hitomi et al. |
| 4,212,375 | A | 7/1980 | Peterson et al. |
| 4,235,308 | A | 11/1980 | Davis |
| 4,279,328 | A | 7/1981 | Ahlbom |
| 4,411,582 | A | 10/1983 | Nakada |
| 4,439,102 | A | 3/1984 | Allen |
| 4,491,918 | A | 1/1985 | Yuki et al. |
| 4,499,541 | A | 2/1985 | Yuki et al. |
| 4,509,127 | A | 4/1985 | Yuki et al. |
| 4,511,974 | A | 4/1985 | Nakane et al. |
| 4,517,645 | A | 5/1985 | Yuki et al. |
| 4,520,443 | A | 5/1985 | Yuki et al. |
| 4,547,844 | A | 10/1985 | Adams |
| 4,598,797 | A | 7/1986 | Schultz |
| 4,612,623 | A | 9/1986 | Bazarnik |
| 4,634,332 | A | 1/1987 | Kamide et al. |
| 4,708,577 | A | 11/1987 | Fratzke |
| 4,782,920 | A | 11/1988 | Gaibler et al. |
| 4,957,408 | A | 9/1990 | Ohkura |
| 5,006,829 | A | 4/1991 | Miyamoto et al. |
| 5,011,358 | A | 4/1991 | Andersen et al. |
| 5,056,437 | A | 10/1991 | Maddock |
| 5,088,879 | A | 2/1992 | Ranly |
| 5,208,753 | A | 5/1993 | Acuff |
| 5,224,815 | A | 7/1993 | Abels et al. |
| 5,238,086 | A | 8/1993 | Aoki et al. |
| 5,555,957 | A | 9/1996 | Dreher et al. |
| 5,586,620 | A | 12/1996 | Dammeyer et al. |
| 5,734,377 | A | 3/1998 | Fukuzaki |
| 5,749,696 | A | 5/1998 | Johnson |
| 5,791,440 | A | 8/1998 | Lonzinski et al. |
| 5,880,684 | A | 3/1999 | Diekhans et al. |
| 5,890,086 | A | 3/1999 | Wellman et al. |
| 5,956,255 | A | 9/1999 | Flamme |
| 5,994,650 | A | 11/1999 | Eriksson et al. |
| 5,995,001 | A | 11/1999 | Wellman et al. |
| 6,005,299 | A | 12/1999 | Hengst |
| 6,039,141 | A | 3/2000 | Denny |
| 6,049,813 | A | 4/2000 | Danielson et al. |
| 6,073,069 | A | 6/2000 | Kim |
| 6,100,476 | A | 8/2000 | Adamietz et al. |
| 6,128,007 | A | 10/2000 | Seybold |
| 6,128,553 | A | 10/2000 | Gordon et al. |
| 6,138,795 | A | 10/2000 | Kamiya |
| 6,164,415 | A | 12/2000 | Takeuchi et al. |
| 6,209,913 | B1 | 4/2001 | Ishikawa et al. |
| 6,282,464 | B1 | 8/2001 | Obradovich |
| 6,331,866 | B1 | 12/2001 | Eisenberg |
| 6,343,237 | B1 | 1/2002 | Rossow et al. |
| 6,345,694 | B1 | 2/2002 | Volker |
| 6,369,717 | B1 | 4/2002 | Damiani et al. |
| 6,429,773 | B1 | 8/2002 | Schuyler |
| 6,437,701 | B1 | 8/2002 | Muller |
| 6,494,527 | B1 | 12/2002 | Bischoff |
| 6,539,289 | B2 | 3/2003 | Ogino et al. |
| 6,600,418 | B2 | 7/2003 | Francis et al. |
| 6,640,114 | B2 | 10/2003 | Bae |
| 6,648,581 | B2 | 11/2003 | Gibson |
| 6,667,726 | B1 | 12/2003 | Damiani et al. |
| 6,686,911 | B1 | 2/2004 | Levin et al. |
| 6,724,403 | B1 | 4/2004 | Santoro et al. |
| 6,817,824 | B2 | 11/2004 | Winkler |
| 7,010,404 | B2 | 3/2006 | Ichijo et al. |
| 7,028,264 | B2 | 4/2006 | Santoro et al. |
| 7,089,098 | B2 | 8/2006 | Rogg et al. |
| 7,154,480 | B2 | 12/2006 | Iesaka |
| 7,165,643 | B2 | 1/2007 | Bozem et al. |
| D537,374 | S | 2/2007 | Smiley |
| 7,172,050 | B2 | 2/2007 | Amamiya |
| 7,192,236 | B1 | 3/2007 | Upmeyer |
| 7,216,024 | B1 | 5/2007 | Abels et al. |
| 7,219,769 | B2 | 5/2007 | Yamanouchi et al. |
| 7,225,413 | B1 | 5/2007 | Kuenzner et al. |
| 7,237,203 | B1 | 6/2007 | Kuenzner |
| 7,274,970 | B2 | 9/2007 | Schuchard |
| 7,287,625 | B1 | 10/2007 | Harris |
| 7,322,444 | B2 | 1/2008 | Allerding et al. |
| 7,360,175 | B2 | 4/2008 | Gardner et al. |
| 7,372,473 | B2 | 5/2008 | Venolia |
| 7,376,907 | B2 | 5/2008 | Santoro et al. |
| 7,415,352 | B2 | 8/2008 | Olcott |
| 7,418,670 | B2 | 8/2008 | Goldsmith |
| 7,477,268 | B2 | 1/2009 | Venolia |
| 7,595,722 | B2 | 9/2009 | Heimermann et al. |
| 7,599,776 | B2 | 10/2009 | Sonderegger et al. |
| 7,612,673 | B2 | 11/2009 | Onderko et al. |
| 7,672,768 | B2 | 3/2010 | Narisawa et al. |
| 7,683,771 | B1 | 3/2010 | Loeb |
| 7,706,947 | B2 | 4/2010 | Bozem et al. |
| 7,806,470 | B2 | 10/2010 | Steege et al. |
| 7,822,513 | B2 | 10/2010 | Wulff |
| 7,857,090 | B2 | 12/2010 | Ruhter et al. |
| 7,872,587 | B2 | 1/2011 | Hindryckx et al. |
| 7,896,358 | B2 | 3/2011 | Hoff |
| 7,909,561 | B2 | 3/2011 | Addleman et al. |
| 7,922,899 | B2 | 4/2011 | Vasta et al. |
| 7,987,431 | B2 | 7/2011 | Santoro et al. |
| 7,992,686 | B2 | 8/2011 | McCabe |
| 8,001,483 | B2 | 8/2011 | de Souza et al. |
| 8,055,405 | B2 | 11/2011 | Baginski et al. |
| 8,083,034 | B2 | 12/2011 | Bordwell et al. |
| 8,108,090 | B2 | 1/2012 | Bauer |
| 8,125,457 | B2 | 2/2012 | Lawson et al. |
| 8,201,097 | B2 | 6/2012 | Kondo et al. |

(56) References Cited

U.S. PATENT DOCUMENTS

| | | |
|---|---|---|
| 8,207,841 B2 | 6/2012 | Watson et al. |
| 8,230,976 B2 | 7/2012 | Baldini |
| 8,239,251 B2 | 8/2012 | Wellman |
| 8,265,836 B2 | 9/2012 | Yamada et al. |
| 8,340,873 B2 | 12/2012 | Finley et al. |
| 8,362,893 B2 | 1/2013 | Ishikawa |
| 8,443,943 B2 | 5/2013 | McCabe et al. |
| 8,482,534 B2 | 7/2013 | Pryor |
| 8,515,629 B2 | 8/2013 | Medwin et al. |
| 8,521,373 B2 | 8/2013 | Behncke et al. |
| 8,536,996 B2 | 9/2013 | Watson et al. |
| 8,549,432 B2 | 10/2013 | Warner |
| 8,565,913 B2 | 10/2013 | Emanuel et al. |
| 8,583,314 B2 | 11/2013 | de Oliveira et al. |
| 8,627,073 B2 | 1/2014 | Kherani et al. |
| 8,632,082 B2 | 1/2014 | Lantz et al. |
| 8,649,964 B2 | 2/2014 | Kizaki |
| 8,682,401 B2 | 3/2014 | Ebner et al. |
| 8,694,194 B2 | 4/2014 | Waltz et al. |
| 8,701,044 B2 | 4/2014 | Kolletzki |
| 8,706,920 B2 | 4/2014 | Fleizach et al. |
| 8,713,467 B1 | 4/2014 | Goldenberg et al. |
| 8,731,785 B2 | 5/2014 | McCabe et al. |
| 8,756,002 B2 | 6/2014 | Sathish |
| 8,763,759 B2 | 7/2014 | Viereck et al. |
| 8,781,642 B2 | 7/2014 | Tarasinski et al. |
| 8,799,799 B1 | 8/2014 | Cervelli et al. |
| 8,811,265 B2 | 8/2014 | Horvath |
| 8,836,545 B2 | 9/2014 | Eckstein et al. |
| 8,849,510 B2 | 9/2014 | Tanaka |
| 8,892,241 B2 | 11/2014 | Weiss |
| 8,892,294 B2 | 11/2014 | Waltz et al. |
| 8,907,778 B2 | 12/2014 | Waller et al. |
| 8,977,441 B2 | 3/2015 | Grimes et al. |
| 9,002,626 B2 | 4/2015 | Waltz et al. |
| 9,008,856 B2 | 4/2015 | Ricci et al. |
| 9,025,827 B2 | 5/2015 | Holeva et al. |
| 9,057,221 B2 | 6/2015 | Warr |
| 9,075,468 B2 | 7/2015 | Becker et al. |
| 9,080,319 B2 | 7/2015 | Oates, Jr. et al. |
| 9,128,575 B2 | 9/2015 | Lee |
| 9,160,854 B1 | 10/2015 | Daddi et al. |
| 9,181,965 B2 | 11/2015 | Pirotais |
| 9,235,553 B2 | 1/2016 | Fitch et al. |
| 9,278,839 B2 | 3/2016 | Gilbride et al. |
| 9,361,000 B2 | 6/2016 | Furue et al. |
| 9,434,585 B2 | 9/2016 | Gilbride et al. |
| 9,448,692 B1 | 9/2016 | Mierau et al. |
| 9,575,628 B2 | 2/2017 | Meegan et al. |
| 9,658,738 B1 | 5/2017 | Park et al. |
| 9,723,457 B2 | 8/2017 | Brahmi et al. |
| 9,740,304 B2 | 8/2017 | Chandel et al. |
| 9,760,644 B2 | 9/2017 | Khvostichenko et al. |
| 9,792,013 B2 | 10/2017 | Fleizach et al. |
| 9,952,703 B2 | 4/2018 | Hoen et al. |
| 10,073,708 B2 | 9/2018 | Kardamilas |
| 10,138,101 B2 | 11/2018 | Svensson et al. |
| 10,282,088 B2 | 5/2019 | Kim et al. |
| 2002/0070852 A1 | 6/2002 | Trauner et al. |
| 2002/0084887 A1 | 7/2002 | Arshad et al. |
| 2003/0205433 A1 | 11/2003 | Hagman |
| 2004/0031649 A1 | 2/2004 | Schiebel et al. |
| 2004/0150674 A1 | 8/2004 | Takahashi et al. |
| 2004/0200644 A1 | 10/2004 | Paine et al. |
| 2004/0233234 A1 | 11/2004 | Chaudhry et al. |
| 2004/0249538 A1 | 12/2004 | Osaki et al. |
| 2005/0102081 A1 | 5/2005 | Patterson |
| 2005/0113944 A1 | 5/2005 | Santarossa |
| 2005/0172239 A1 | 8/2005 | Liu et al. |
| 2006/0015818 A1 | 1/2006 | Chaudhri et al. |
| 2006/0182582 A1 | 8/2006 | Sharpton |
| 2006/0224945 A1 | 10/2006 | Khan et al. |
| 2007/0007080 A1 | 1/2007 | Manthey et al. |
| 2007/0111672 A1 | 5/2007 | Saintoyant et al. |
| 2007/0210901 A1 | 9/2007 | Ahrens et al. |
| 2007/0213869 A1 | 9/2007 | Bandringa et al. |
| 2007/0233304 A1 | 10/2007 | Baginski et al. |
| 2007/0236475 A1 | 10/2007 | Wherry |
| 2008/0015955 A1 | 1/2008 | Ehrman et al. |
| 2008/0055273 A1 | 3/2008 | Forstall |
| 2008/0067005 A1 | 3/2008 | Hagman |
| 2008/0154712 A1 | 6/2008 | Wellman |
| 2008/0211779 A1* | 9/2008 | Pryor .................. G06F 3/04847 345/173 |
| 2009/0057065 A1 | 3/2009 | Akaki et al. |
| 2009/0059004 A1 | 3/2009 | Bochicchio |
| 2009/0101447 A1 | 4/2009 | Durham et al. |
| 2009/0125850 A1 | 5/2009 | Karstens |
| 2009/0236183 A1 | 9/2009 | Bordwell et al. |
| 2009/0265059 A1* | 10/2009 | Medwin ............... B66F 9/0755 701/31.4 |
| 2009/0267921 A1 | 10/2009 | Pryor |
| 2009/0271778 A1 | 10/2009 | Mandyam et al. |
| 2009/0326717 A1 | 12/2009 | Vaherto |
| 2010/0005419 A1 | 1/2010 | Miichi et al. |
| 2010/0023865 A1 | 1/2010 | Fulker et al. |
| 2010/0039247 A1 | 2/2010 | Ziegler et al. |
| 2010/0100512 A1 | 4/2010 | Brodin et al. |
| 2010/0223332 A1 | 9/2010 | Maxemchuk et al. |
| 2010/0277438 A1 | 11/2010 | Kawashima et al. |
| 2011/0088979 A1 | 4/2011 | Bandringa et al. |
| 2011/0106294 A1 | 5/2011 | Bebbington |
| 2011/0119614 A1 | 5/2011 | Powell et al. |
| 2011/0234389 A1 | 9/2011 | Mellin |
| 2011/0238259 A1 | 9/2011 | Bai et al. |
| 2011/0252369 A1 | 10/2011 | Chaudhri |
| 2011/0320978 A1 | 12/2011 | Horodezky et al. |
| 2012/0012425 A1 | 1/2012 | Hayase et al. |
| 2012/0053754 A1 | 3/2012 | Pease et al. |
| 2012/0096979 A1 | 4/2012 | Trujillo Linke |
| 2012/0110493 A1 | 5/2012 | Cabral |
| 2012/0229394 A1 | 9/2012 | Ehrl et al. |
| 2012/0229493 A1 | 9/2012 | Kim et al. |
| 2012/0235804 A1 | 9/2012 | Gilbride et al. |
| 2012/0256843 A1* | 10/2012 | Epple .................. A01D 41/127 345/169 |
| 2012/0275892 A1 | 11/2012 | Allerding et al. |
| 2012/0284658 A1 | 11/2012 | Hirvonen |
| 2012/0284673 A1 | 11/2012 | Lamb et al. |
| 2013/0004282 A1 | 1/2013 | Grimes et al. |
| 2013/0050131 A1 | 2/2013 | Lee et al. |
| 2013/0075203 A1 | 3/2013 | Sayles |
| 2013/0081716 A1 | 4/2013 | Pirotais |
| 2013/0093685 A1 | 4/2013 | Kalu et al. |
| 2013/0101173 A1 | 4/2013 | Holeva et al. |
| 2013/0110329 A1 | 5/2013 | Kinoshita et al. |
| 2013/0111410 A1 | 5/2013 | Okada et al. |
| 2013/0132246 A1 | 5/2013 | Amin et al. |
| 2013/0145360 A1 | 6/2013 | Ricci |
| 2013/0152003 A1 | 6/2013 | Ricci et al. |
| 2013/0166146 A1 | 6/2013 | Tanaka |
| 2013/0169549 A1 | 7/2013 | Seymour et al. |
| 2013/0176223 A1 | 7/2013 | Lee et al. |
| 2013/0194228 A1 | 8/2013 | Tuzar |
| 2013/0205258 A1 | 8/2013 | Ecker et al. |
| 2013/0241720 A1 | 9/2013 | Ricci et al. |
| 2013/0254675 A1 | 9/2013 | De Andrade et al. |
| 2013/0285993 A1 | 10/2013 | Manabe et al. |
| 2013/0290887 A1 | 10/2013 | Sun et al. |
| 2013/0305354 A1 | 11/2013 | King et al. |
| 2014/0068477 A1 | 3/2014 | Roh |
| 2014/0081429 A1 | 3/2014 | Miles et al. |
| 2014/0082565 A1 | 3/2014 | Suzuki |
| 2014/0114530 A1 | 4/2014 | Fitch et al. |
| 2014/0123072 A1 | 5/2014 | Bhowmick et al. |
| 2014/0133906 A1 | 5/2014 | Frelich et al. |
| 2014/0139354 A1 | 5/2014 | Miyazaki |
| 2014/0173516 A1 | 6/2014 | Hwang et al. |
| 2014/0188576 A1 | 7/2014 | de Oliveira et al. |
| 2014/0236389 A1 | 8/2014 | Higgins et al. |
| 2014/0258908 A1 | 9/2014 | Miyoshi |
| 2014/0278621 A1 | 9/2014 | Medwin et al. |
| 2014/0320293 A1 | 10/2014 | Hunter, Jr. et al. |
| 2014/0380243 A1 | 12/2014 | Furue et al. |

(56) References Cited

U.S. PATENT DOCUMENTS

| | | |
|---|---|---|
| 2015/0062017 A1 | 3/2015 | Barabas et al. |
| 2015/0064668 A1 | 3/2015 | Manci et al. |
| 2015/0113462 A1 | 4/2015 | Chen et al. |
| 2015/0130712 A1 | 5/2015 | Hirai |
| 2015/0169077 A1 | 6/2015 | Lee |
| 2015/0175397 A1 | 6/2015 | Lynn et al. |
| 2015/0177362 A1 | 6/2015 | Gutierrez et al. |
| 2015/0225218 A1 | 8/2015 | Strand |
| 2015/0226560 A1 | 8/2015 | Chandrasekar et al. |
| 2015/0243167 A1 | 8/2015 | Stahlin |
| 2015/0298549 A1 | 10/2015 | Tamura |
| 2016/0012707 A1 | 1/2016 | McKinley et al. |
| 2016/0026838 A1 | 1/2016 | Gillet et al. |
| 2016/0041803 A1 | 2/2016 | Markov et al. |
| 2016/0054849 A1 | 2/2016 | Steiger |
| 2016/0077688 A1 | 3/2016 | Shim |
| 2016/0082960 A1 | 3/2016 | Slaton et al. |
| 2016/0088146 A1 | 3/2016 | Ying et al. |
| 2016/0196041 A1 | 7/2016 | Lavoie |
| 2016/0306503 A1 | 10/2016 | Youtsey |
| 2016/0313875 A1 | 10/2016 | Williams et al. |
| 2016/0347248 A1 | 12/2016 | Manci et al. |
| 2016/0374002 A1 | 12/2016 | Tuluca |
| 2017/0017392 A1 | 1/2017 | Castaneda et al. |
| 2017/0024058 A1 | 1/2017 | Aubry |
| 2017/0091704 A1 | 3/2017 | Wolf et al. |
| 2017/0120723 A1 | 5/2017 | Sura et al. |
| 2017/0178536 A1 | 6/2017 | Manci et al. |
| 2017/0249745 A1 | 8/2017 | Fiala |
| 2018/0107320 A1 | 4/2018 | Im et al. |
| 2018/0126507 A1 | 5/2018 | Rivers et al. |
| 2018/0143731 A1 | 5/2018 | Ochenas et al. |
| 2018/0143732 A1 | 5/2018 | Ochenas et al. |
| 2018/0143733 A1 | 5/2018 | Ochenas et al. |
| 2018/0143734 A1 | 5/2018 | Ochenas et al. |

FOREIGN PATENT DOCUMENTS

| | | |
|---|---|---|
| DE | 10144751 A1 | 3/2003 |
| DE | 10259704 A1 | 8/2003 |
| DE | 10131839 B4 | 2/2004 |
| DE | 102005022476 A1 | 11/2006 |
| DE | 102007023774 A1 | 11/2008 |
| DE | 102008027695 A1 | 10/2009 |
| DE | 102009032492 A1 | 1/2011 |
| DE | 102010005034 A1 | 7/2011 |
| DE | 102010055971 A1 | 6/2012 |
| DE | 102011012415 A1 | 8/2012 |
| DE | 102011012416 A1 | 8/2012 |
| DE | 102011018520 A1 | 9/2012 |
| DE | 102011018802 A1 | 10/2012 |
| DE | 102011103029 A1 | 12/2012 |
| DE | 102011103214 A1 | 12/2012 |
| DE | 102012204694 A1 | 9/2013 |
| DE | 102013006412 A1 | 10/2014 |
| DE | 102014113555 A1 | 3/2016 |
| DE | 102015107260 A1 | 5/2016 |
| DE | 102016117013 A1 | 3/2018 |
| EP | 416171 A2 | 3/1991 |
| EP | 376206 B1 | 8/1995 |
| EP | 712062 B1 | 3/2001 |
| EP | 812799 B1 | 12/2001 |
| EP | 1203743 B1 | 8/2005 |
| EP | 1247686 B1 | 5/2006 |
| EP | 1468958 B1 | 3/2007 |
| EP | 1179466 B1 | 4/2007 |
| EP | 1447374 B1 | 3/2008 |
| EP | 1553044 B1 | 5/2008 |
| EP | 1604942 B1 | 8/2008 |
| EP | 1714822 B1 | 1/2009 |
| EP | 2272788 A1 | 1/2011 |
| EP | 1350668 B1 | 5/2012 |
| EP | 2123596 B1 | 10/2012 |
| EP | 2439165 B1 | 10/2012 |
| EP | 2511677 A1 | 10/2012 |
| EP | 2512163 A1 | 10/2012 |
| EP | 2518009 A1 | 10/2012 |
| EP | 2527288 B1 | 8/2013 |
| EP | 2631760 A1 | 8/2013 |
| EP | 2412661 B1 | 1/2014 |
| EP | 2518000 B1 | 1/2014 |
| EP | 2649820 B1 | 11/2014 |
| EP | 2799388 A1 | 11/2014 |
| EP | 2647591 B1 | 12/2014 |
| EP | 2470465 B1 | 3/2015 |
| EP | 2653429 B1 | 3/2015 |
| EP | 2653430 B1 | 3/2015 |
| EP | 2848437 A1 | 3/2015 |
| EP | 1655263 B1 | 5/2015 |
| EP | 2172413 B1 | 6/2015 |
| EP | 2886507 A1 | 6/2015 |
| EP | 2574589 B1 | 7/2015 |
| EP | 2889253 A1 | 7/2015 |
| EP | 2889258 A1 | 7/2015 |
| EP | 2916505 A1 | 9/2015 |
| EP | 2924551 A1 | 9/2015 |
| EP | 2930603 A1 | 10/2015 |
| EP | 2848575 B1 | 3/2016 |
| EP | 2889254 B1 | 4/2017 |
| EP | 2889255 B1 | 4/2017 |
| EP | 2889256 B1 | 4/2017 |
| EP | 2338720 B1 | 7/2017 |
| EP | 2518003 B1 | 10/2017 |
| EP | 3023382 B1 | 1/2018 |
| FR | 2975982 A1 | 12/2012 |
| FR | 2975981 B1 | 5/2016 |
| GB | 1387670 A | 3/1975 |
| GB | 2352521 A | 1/2001 |
| GB | 2360500 B | 10/2003 |
| GB | 2460326 A | 12/2009 |
| GB | 2437629 B | 5/2010 |
| JP | 63192398 U | 12/1988 |
| JP | 7002496 A | 1/1995 |
| JP | 07242400 A | 9/1995 |
| JP | 8091794 A | 4/1996 |
| JP | 3166413 B2 | 5/2001 |
| JP | 2003246598 A | 9/2003 |
| JP | 2004083273 A | 3/2004 |
| JP | 3572318 B2 | 9/2004 |
| JP | 2005126017 A | 5/2005 |
| JP | 2010006601 A | 1/2010 |
| JP | 2010008891 A | 1/2010 |
| JP | 2012214155 A | 11/2012 |
| JP | 5109964 B2 | 12/2012 |
| JP | 2013091471 A | 5/2013 |
| JP | 5278997 B2 | 9/2013 |
| JP | 6135698 B2 | 5/2017 |
| WO | 1992004693 A1 | 3/1992 |
| WO | 1998034812 A2 | 8/1998 |
| WO | 0248955 A1 | 6/2002 |
| WO | 2008083982 A1 | 7/2008 |
| WO | 2009026663 A1 | 3/2009 |
| WO | 2009091639 A1 | 7/2009 |
| WO | 2011033015 A1 | 3/2011 |
| WO | 2012110207 A1 | 8/2012 |
| WO | 2013074899 A1 | 5/2013 |
| WO | 2013158079 A1 | 10/2013 |
| WO | 2014120248 A1 | 8/2014 |
| WO | 2015151619 A1 | 10/2015 |
| WO | 2017015046 A1 | 1/2017 |

OTHER PUBLICATIONS

Vu, Toan H.; Office Action; U.S. Appl. No. 15/815,778; dated Apr. 29, 2020; United States Patent and Trademark Office; Alexandria, Virginia.

Song, Daeho D.; Office Action; U.S. Appl. No. 15/815,801; dated Apr. 22, 2020; United States Patent and Trademark Office; Alexandria, Virginia.

Johan Bengtsson; Communication pursuant to Article 94(3); European Application No. 16742538.8; dated Mar. 16, 2020; European Patent Office; Berlin, Germany.

(56) References Cited

OTHER PUBLICATIONS

Vu, Toan H.; Office Action; U.S. Appl. No. 15/815,778; dated Oct. 18, 2019; United States Patent and Trademark Office; Alexandria, VA.
Bengtsson, Johan, EPC Official Action; European Patent Application No. 16742538.8; dated Jul. 10, 2019; European Patent Office; Munich, Germany.
Song, Daeho D.; Office Action; U.S. Appl. No. 15/815,801; dated Dec. 23, 2019; United States Patent and Trademark Office; Alexandria, Virginia.
Leggett, Andrea C.; Office Action; U.S. Appl. No. 15/815,810; dated Dec. 30, 2019; United States Patent and Trademark Office; Alexandria, Virginia.
"Topcon demonstrates iPad-like X30 console," Topcon Precision Agriculture; https://www.youtube.com/watch?v=jlSTF8e6UTA; published on Oct. 2, 2011.
Andrea C. Leggett; Notice of Allowance and Fees Due; U.S. Appl. No. 15/815,810; dated Apr. 17, 2020; United States Patent and Trademark Office; Alexandria, Virginia.
Abou El Seoud, Mohamed; Office Action; U.S. Appl. No. 15/815,788; dated May 14, 2020; United States Patent and Trademark Office; Alexandria, Virginia.
Levy, Amy M.; Notice of Allowance; U.S. Appl. No. 15/210,049; dated May 16, 2019; United States Patent & Trademark Office; Alexandria, VA.
Levy, Amy M.; Office Action; U.S. Appl. No. 15/210,049; dated Aug. 7, 2018; United States Patent & Trademark Office; Alexandria, VA.
Levy, Amy M.; Final Office Action; U.S. Appl. No. 15/210,049; dated Nov. 30, 2018; United States Patent & Trademark Office; Alexandria, VA.
Android Developers Blog, "Touch Mode," Dec. 1, 2008, available at https://android-developers.googleblog.com/2008/12/touch-mode.html.
Android Developers, "Optimizing Navigation for TV," Apr. 9, 2012, available at https://stuff.mit.edu/afs/sipb/project/android/docs/training/tv/optimizing-navigation-tv.html.
Android Developers, "View—Android SDK," Jul. 11, 2012, available at http://tool.oschina.net/uploads/apidocs/android/reference/android/view/View.html.
Brochure, "Fendt Variotronic," Variotronic/1.0-EN/06-11/4.5-E, document creation date Jun. 8, 2011, 24 pages.
Operator Manual, FendtTM "VarioDoc—VarioGuide," Nov. 2011, selected pages (16 pages total).
Operator's Manual, Fendt "VarioDoc," Nov. 2015, 128 pages.
Operator's Manual, Fendt "VarioGuide: VarioGuide Novatel and VarioGuide Trimble," Nov. 2015, 158 pages.
Apps4Android, "Implementing Accessibility on Android," Apr. 18, 2012, available at http://www.apps4android.org/?p=3628.
"IEFIS Panel User Manual," Jul. 9, 2012, 44 pages.
Karlson, A.K. and Bederson, B.B., "Direct Versus Indirect Input Methods for One-Handed Touchscreen Mobile Computing," Human-Computer Interaction Lab, University of Maryland, Apr. 2007, 10 pages.
Wyttenbach, Joel; Youtube video; "Fendt 3 point hitch"; published Feb. 1, 2013; https://www.youtube.com/watch?v=Vvdw7InNpWE.
Youtube video; "Aero-TV: Big, Bright and Beautiful—MGL iEFIS Challenger 10.4" Display System"; Aero-News Network; published Nov. 21, 2013; https://www.youtube.com/watch?v=-qZIW4a36ak.
Youtube video; Honeywell; "Bendix King KSN770 FMS Safety Display"; Avweb; published Sep. 10, 2013; https://www.youtube.com/watch?v=iYMZPoGGtms.
Youtube video; Pretorian Technologies Ltd.; "iOS 7 Switch Control—An Introduction"; published Sep. 17, 2013; https://www.youtube.com/watch?v=SnDA2pbBsTQ.
Ogasawara, Todd; Youtube video; "T-Mobile G1 Trackball Demo"; Oct. 22, 2008; https://www.youtube.com/watch?v=Tq3lwVszW4o.
Wyttenbach, Joel; Youtube video; "Driving a Fendt"; published Feb. 2, 2013; https://www.youtube.com/watch?v=tyX5UPYWFR8&t=7s.
Internet video; Fendt.TV; "Operating the new Varioterminal"; Sep. 4, 2010; https://www.fendt.tv/en/home/operating-the-new-varioterminal_1312.aspx.
Internet video; Fendt.TV; "Fendt Variotronic"; Nov. 10, 2013; https://www.fendt.tv/en/home/fendt-variotronic-the-leading-edge-through-integration_1612.aspx.
"Mazda3 Navigation System—Information Guide", Maple Shade Mazda; https://www.youtube.com/watch?v=CzSW38Uu_5s; published on Oct. 9, 2013.
"The Tech Inside, Episode 3: 2014 Mazda 6"; PhoneDog; https://www.youtube.com/watch?v=odpnSuUefNg; published on Aug. 1, 2013.
"2013 and 2014 CX-5 Navigation System Tutorial"; Don Mealey's Sport Mazda; https://www.youtube.com/watch?v=y9v1dvxsfDU; published on Jul. 27, 2013.
"How-To-Use: 2013 Mazda CX-9 Navigation Tutorial Video"; RamseyMazdaNJ; https://www.youtube.com/watch?v=P584CUo8Hno; published on Jul. 10, 2013.
"Mazda CX-5—Navigation System—Information Guide"; Maple Shade Mazda; https://www.youtube.com/watch?v=JLTMeOalaaM; published on Jul. 23, 2013.
"2014 Ford Fiesta MyFord Touch Infotainment Review"; Alex on Autos; https://www.youtube.com/watch?v=p6FM6mwfLGU; published Dec. 4, 2013.
"Navigating Infotainment With a Navigation System"; AutoHow2; https://www.youtube.com/watch?v=zuQ-ZKeu6Fk&feature=youtube; published on Nov. 4, 2013.
"Take a Tour of the Latest BMW iDrive system"; bmwopenroad; https://www.youtube.com/watch?v=XdnOjevfWIE; published on Jul. 30, 2010.
"BMW X5 touchscreen"; Naessenselectronics; https://www.youtube.com/watch?v=VNReXZFKZI4; published on Jul. 11, 2012.
Joe Bruzek; "Mazda Turns Up Connectivity With New System"; Cars.com; published on Nov. 14, 2013; https://www.cars.com/articles/2013/11/mazda-turns-up-connectivily-with-new-system/; downloaded on Sep. 12, 2018.
"Using Infotainment with a Navigation System—Buick LaCrosse" video transcription; AutoHow2—Informative Automotive Videos; http://www.autohow2.com/video/using-infotainment-with-navigation-buick-lacrosse; downloaded on Sep. 12, 2018.
"Fendt Teach In," https://www.youtube.com/watch?v=b16uS4SnDEs; published on May 10, 2013.
"Fendt touchscreen overview," https://www.youtube.com/watch?v=idPm92i3cY0; published on Feb. 3, 2013.
"Fendt Variotronic," https://www.youtube.com/watch?v=EEYAnEzennA; published on May 4, 2010.
Bengtsson, Johan; International Search Report and Written Opinion of the International Search Authority; International Application No. PCT/US2016/042230; dated Oct. 10, 2016; European Patent Office; Rijswijk, Netherlands.
"Intelliview™ IV 10.4" Color Touchscreen Display"; Farm with Precision with New Holland; http://newhollandrochester.com/wp-content/uploads/pdf-front/145865207194354078.pdf.
"Winmate's Military Grade Rugged Console Panel PC and Display"; Jun. 25, 2014; http://www.army-technology.com/contractors/computers/winmate-communication/pressreleases/presswinmates-military-grade-rugged-console-panel-pc-and-display.
"Jungheinrich Presents New Reach Truck"; Mar. 19, 2013; Jungheinrich; http://www.jungheinrich.com/en/press/article/nl/310-jungheinrich-presents-new-reach-truck/.
"Linde Safety Pilot: A technical breakthrough"; Industrial Vehicle Technology International report; Apr. 25, 2014; http://www.ivtinternational.com/news.php?NewsID=58313.
Kaiser, Tiffany; "Microsoft Brings Live Tiles to Infotainment Systems with 'Windows in the Car' Concept"; Apr. 7, 2014; http://www.dailytech.com/microsoft+brings+live+tiles+to+infotainment+systems+with+windows+in+the+car+concept/article34667.htm.
Michelangelo, Barba; International Search Report and Written Opinion of the International Searching Authority; International Application No. PCT/US2017/062137; dated Feb. 26, 2018; European Patent Office; Rijswijk, Netherlands.
"Next Generation of Winmate G-Win Series with Intel's® latest quad-core Bay Trail processor," http://www.army-technology.com/

(56) References Cited

OTHER PUBLICATIONS contractors/computers/winmate-communication/pressreleases/pressnext-generation-g-win-series; published May 7, 2014.

Michelangelo, Barba; International Search Report and Written Opinion of the International Searching Authority; International Application No. PCT/US2017/062140; dated Feb. 26, 2018; European Patent Office; Rijswijk, Netherlands.

Michelangelo, Barba; International Search Report and Written Opinion of the International Searching Authority; International Application No. PCT/US2017/062145; dated Feb. 26, 2018; European Patent Office; Rijswijk, Netherlands.

Michelangelo, Barba; International Search Report and Written Opinion of the International Searching Authority; International Application No. PCT/US2017/062130; dated Mar. 1, 2018; European Patent Office; Rijswijk, Netherlands.

Intermec Vehicle-Mount Computers Deliver Next Generation Technology to the Forklift, Boosting Productivity and Performance; Intermic; News Release; Jan. 2, 2012; Everett, Washington; https://www.intermec.com/about_us/newsroom/press_releases/2012-02-01-CV41-CV61-Forklift-Vehicle-Mount-Computers.aspx.

Operator Manual for Crown RM 6000 Series Truck, Document No. PF18574 Rev. May 2017, © 2010, four pages; Crown Equipment Corporation.

"Mastering ease of use with Topcon System 350," Topcon Precision Agriculture; https://www.youtube.com/watch?v=far-XW8qKMY; published on Oct. 19, 2012.

"Topcon X30 and System 350," Topcon Precision Agriculture; https://www.youtube.com/watch?v=mBa_Xk7HjU; published on Nov. 17, 2011.

Vu, Toan H.; Office Action; U.S. Appl. No. 15/815,778; dated Sep. 3, 2020; United States Patent and Trademark Office; Alexandria, Virginia.

Notification of the First Office Action; Chinese Patent Application No. 201680034684.4; dated Jul. 22, 2020; China National Intellectual Property Administration; Beijing, China.

Song, Daeho D.; Advisory Action; U.S. Appl. No. 15/815,801; dated Jul. 14, 2020; United States Patent and Trademark Office; Alexandria, Virginia.

Final Office Action dated Oct. 1, 2020; U.S. Appl. No. 15/815,788; United States Patent and Trademark Office; Alexandria, Virginia.

Australian Examination Report No. 1 dated Oct. 8, 2020; Australian Application No. 2016296471; IP Australia.

Communication Pursuant to Article 94(3) EPC dated Oct. 8, 2020; European Patent Application No. 17812130; European Patent Office; Berlin, Germany.

Communication Under Rule 71(3) EPC dated Oct. 7, 2020; European Patent Application No. 17811772; European Patent Office; Berlin, Germany; p. 8.

Anthony T. Castaneda et al.; Related U.S. Appl. No. 17/164,953, filed Feb. 2, 2021 entitled Processing Device Having a Graphical User Interface for Industrial Vehicle.

\* cited by examiner

PROCESSING DEVICE HAVING A GRAPHICAL USER INTERFACE FOR INDUSTRIAL VEHICLE

CROSS REFERENCE TO RELATED APPLICATIONS

This application is a continuation of U.S. patent application Ser. No. 15/210,049, filed Jul. 14, 2016, entitled PROCESSING DEVICE HAVING A GRAPHICAL USER INTERFACE FOR INDUSTRIAL VEHICLE, now allowed, which claims the benefit of U.S. Provisional Patent Application Ser. No. 62/193,840, filed Jul. 17, 2015, entitled PROCESSING DEVICE HAVING A GRAPHICAL USER INTERFACE FOR INDUSTRIAL VEHICLE, the disclosures of which are hereby incorporated herein by reference.

BACKGROUND

The present disclosure relates to electronic systems for industrial vehicles that collect and present information to a user via a graphical user interface.

Wireless strategies are being deployed by business operations, including distributors, retail stores, manufacturers, etc., to improve the efficiency and accuracy of business operations. Wireless strategies may also be deployed by such business operations to avoid the insidious effects of constantly increasing labor and logistics costs.

In a typical wireless implementation, workers are linked to a management system executing on a corresponding computer enterprise via mobile wireless transceivers. The wireless transceivers are used as interfaces to the management system to direct workers in their tasks, e.g., by instructing workers where and/or how to pick, pack, put away, move, stage, process or otherwise manipulate the items within a facility. The wireless transceiver may also be used in conjunction with a suitable input device to scan, sense or otherwise read tags, labels or other identifiers to track the movement of designated items within the facility.

BRIEF SUMMARY

According to aspects of the present disclosure, a processing device having a graphical user interface is disclosed. The processing device comprises a housing having a front face. Here, the front face defines a control section and a display section. A touch screen display is provided within the display section of the front face of the housing. Also, a set of controls is arranged within the control section of the front face of the housing. Moreover, the processing device comprises a controller communicably connected to the touch screen display and each control of the set of controls. The controller is operatively programmed to detect gesture commands entered by an operator through interaction with the touch screen display, and to detect operator interactions with the set of controls. The processing device executes computer code that implements a set of widgets viewable on the touch screen display, where the set of widgets organized to define a motion home screen position that displays at least one travel related widget, and a lift home screen position that displays at least one lift related widget. Accordingly, when installed on an industrial vehicle, and when a current operating state of a traction control module of the industrial vehicle indicates that a traction control is engaged, the controller causes the display to snap to the motion home screen position. Likewise, when installed on an industrial vehicle, and when a current operating state of a hydraulic module of the industrial vehicle indicates that forks are engaged in a lift operation on the industrial vehicle, the controller causes the display to snap to the lift home screen position.

According to further aspects of the present disclosure, a processing device having a graphical user interface is provided. The processing device comprises a housing having a front face. Here, the front face defines a control section and a display section. A touch screen display is provided within the display section of the front face of the housing. Also, a set of controls is arranged within the control section of the front face of the housing. A controller is communicably connected to the touch screen display and each control of the set of controls. Under this configuration, the controller is operatively programmed to detect gesture commands entered by an operator through interaction with the touch screen display, and to detect operator interactions with the set of controls. Accordingly, when installed on an industrial vehicle, the processing device executes computer code that implements a set of widgets, where each widget represents live data representing a current state associated with the industrial vehicle or a vehicle operator. The set of widgets is organized to define a motion home screen position that displays at least one relevant travel related widget. As such, when the industrial vehicle is stopped, a vehicle operator can navigate through graphical representations of the set of widgets on the display using any combination of the gesture commands and the set of controls. Also, when a current operating state of a traction control module indicates that a traction control is engaged, the controller causes the display to snap to the motion home screen position.

According to yet further aspects of the present disclosure, a processing device having a graphical user interface is provided. The processing device comprises a housing having a front face. Here, the front face defines a control section and a display section. A touch screen display is provided within the display section of the front face of the housing. Also, a set of controls is arranged within the control section of the front face of the housing. A controller is communicably connected to the touch screen display and each control of the set of controls. In this regard, the controller is operatively programmed to detect gesture commands entered by an operator through interaction with the touch screen display, and to detect operator interactions with the set of controls. When the display device is installed on an industrial vehicle, the processing device executes computer code that implements a set of widgets, where each widget represents live data representing a current state associated with the vehicle or a vehicle operator. The set of widgets is organized to define a lift home screen position that displays at least one relevant lift related widget. Accordingly, when the industrial vehicle is stopped, a vehicle operator can navigate through graphical representations of the set of widgets on the display using any combination of the gesture commands and the set of controls. Also, when a current operating state of a hydraulic module indicates that forks are engaged in a lift operation on the industrial vehicle, the controller causes the display to snap to the lift home screen position.

DETAILED DESCRIPTION

Figure 1:
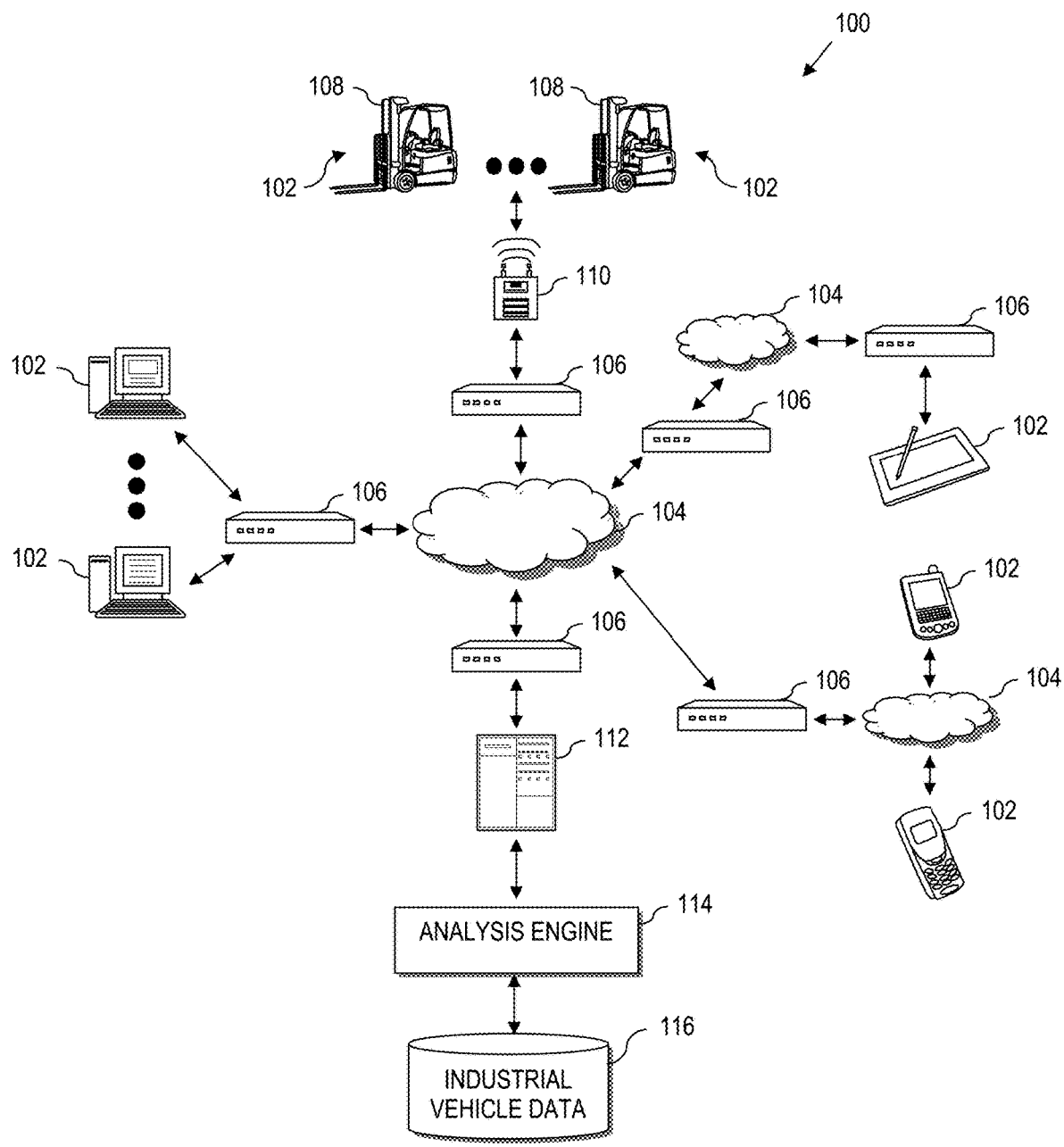
FIG. 1 is a block diagram of an industrial vehicle computing enterprise, according to aspects of the present disclosure.

According to various aspects of the present disclosure, a processing device having a graphical user interface is provided, which is suitable for use on an industrial vehicle. The processing device includes a housing having a front face, where the front face defines a display section and a vehicle operator control section. A touch screen display is provided within the display section of the front face of the housing. The touch screen display receives touch gesture commands from a vehicle operator.

Still further, a set of controls (e.g., designated as up, down, left, right, and select) is arranged within the vehicle operator control section of the front face of the housing. The set of controls include hardware control equivalents to the gesture commands recognized by the touch screen of the display. A controller is communicably connected to the touch screen display and the set of controls. The controller detects interactions with the touch screen display and the set of controls such that an up swipe gesture command on the touch screen and operation of the up control within the control section both map to the same first graphical user interface command. The first graphical user interface command may comprise, for instance, a command to navigate up one menu option, scroll up in an image that is too large to fit in the area of the display screen, etc.

The controller maps the right swipe gesture command on the touch screen and operation of the right control within the control section to the same second graphical user interface command. The second graphical user interface command may comprise, for instance, scrolling to the right to expose new widgets, scrolling through a set of option choices within a menu, scrolling to the right of an image that is too large to fit in the area of the display screen, etc.

The controller likewise maps the left swipe gesture command on the touch screen and operation of the left control within the control section both to the same third graphical user interface command. The third graphical user interface command may comprise, for instance, scrolling to the left to expose new widgets, scrolling back out of a set of option choices within a menu, scrolling to the left of an image that is too large to fit in the area of the display screen, etc.

The controller also maps the down swipe gesture command on the touch screen and operation of the down control within the control section to the same fourth graphical user interface command. The fourth graphical user interface command may comprise, for instance, a command to navigate down one menu option, scroll down in an image that is too large to fit in the area of the display screen, etc.

The controller yet further maps the element select gesture command on the touch screen (e.g., touch, press, release, etc.) and operation of the select control within the control section to the same fifth graphical user interface command. The fifth graphical user interface command may be to execute an enter command, select command, acknowledgement command, clear command, etc.

This allows industrial vehicle operators to wear gloves or other equipment suitable for (or otherwise required by) the assigned task, without undue interference interacting with the graphical user interface. Also, redundant control, e.g., via gesture commands recognized by the touch screen of the display and corresponding controls in the vehicle operator control section, allow the vehicle operator to use whichever option is most convenient for speed, convenience, workflow, etc.

According to further aspects of the present disclosure, the graphical user interface enables customization of industrial vehicle operational information, including customization of widgets, messaging, themes, language and other features. Moreover, in an example implementation, the vehicle operator input controls interact with, or control, elements in the graphical user interface as viewed on the display. As such, a vehicle operator can interact with the processing device, e.g., to respond to requests for information, to set up, organize, customize, etc., widgets and other display elements, or otherwise provide feedback to the processing device using the controls of the graphical user interface, the touch screen features of the display, or combinations thereof.

The disclosure herein improves the technologies of industrial vehicles, operator-to-machine interaction, operation of an industrial vehicle in a work environment, and effective information push to the operator and information retrieval by the operator. In particular, various aspects of the present disclosure address the technical problem of computer interaction in industrial environments by providing dual controls implemented as touch screen gesture commands and hardware equivalent controls that are collocated adjacent to one another in a common housing. The present disclosure also addresses the technical problem of efficiently and effectively displaying (and optionally selectively obscuring and revealing) data including operational factors including time, industrial vehicle operating conditions and/or state, environmental conditions and/or state, operator conditions and/or state, combinations thereof, etc.

The processes set out herein are necessarily rooted in computer technology to overcome problems arising with graphical user interfaces in industrial applications. In this regard, the processing devices set out herein are not merely general purpose computer components. Rather, the processing devices are special purpose machines built specifically for industrial vehicles used in dynamic and mobile work environments that can require multiple modes of operator interaction and operation.

The technical solutions herein bring about several technical effects, including an ability to seamlessly and dynamically switch between touch gesture commands and hardware counterparts as the job and the specific application dictates. The technical solutions also bring about improved industrial vehicle performance via efficient and effective display of relevant information, including vehicle operating conditions and/or state, environmental conditions and/or state, operator conditions and/or state, combination thereof, etc.

System Overview:

Turning now to the figures and in particular to FIG. 1, a general diagram of a computer system 100 is illustrated according to various aspects of the present disclosure. The illustrated computer system 100 is a special purpose (particular) system that operates in a manner that enables industrial vehicles to communicate wirelessly across a computer enterprise. The computer system 100 comprises a plurality of hardware processing devices (designated generally by the reference 102) that are linked together by one or more network(s) (designated generally by the reference 104).

The network(s) 104, e.g., wired or wireless networks, provide communications links between the various processing devices 102 and may be supported by networking components 106 that interconnect the processing devices 102, including for example, routers, hubs, firewalls, network interfaces, wired or wireless communications links and corresponding interconnections, cellular stations and corresponding cellular conversion technologies (e.g., to convert between cellular and TCP/IP, etc.).

A processing device 102 can be any device capable of communicating over the network 104. In certain contexts and roles, a processing device 102 is intended to be mobile (e.g., a hardware-based processing device 102 provided on an industrial vehicle 108 such as a forklift truck, reach truck, stock picker, turret truck, tow tractor, rider pallet truck, walkie stacker truck, etc.). In this regard, industrial vehicles include a processing device 102 that communicates wirelessly to the network 104 to carry out the features described herein. Under such circumstances, the industrial vehicles 108 can wirelessly communicate through one or more access points 110 to a corresponding networking component 106. Also, the industrial vehicles 108 can be equipped with WiFi, cellular or other suitable technology that allows the processing device 102 on the industrial vehicle 108 to communicate directly with a remote device (e.g., over the networks 104).

The illustrative computer system 100 also includes a hardware server 112 (e.g., a web server, file server, and/or other processing device) that supports an analysis engine 114 and corresponding data sources (collectively identified as data sources 116). The analysis engine 114 and data sources 116 provide the resources processing devices 102 installed on industrial vehicles 108.

Figure 2:
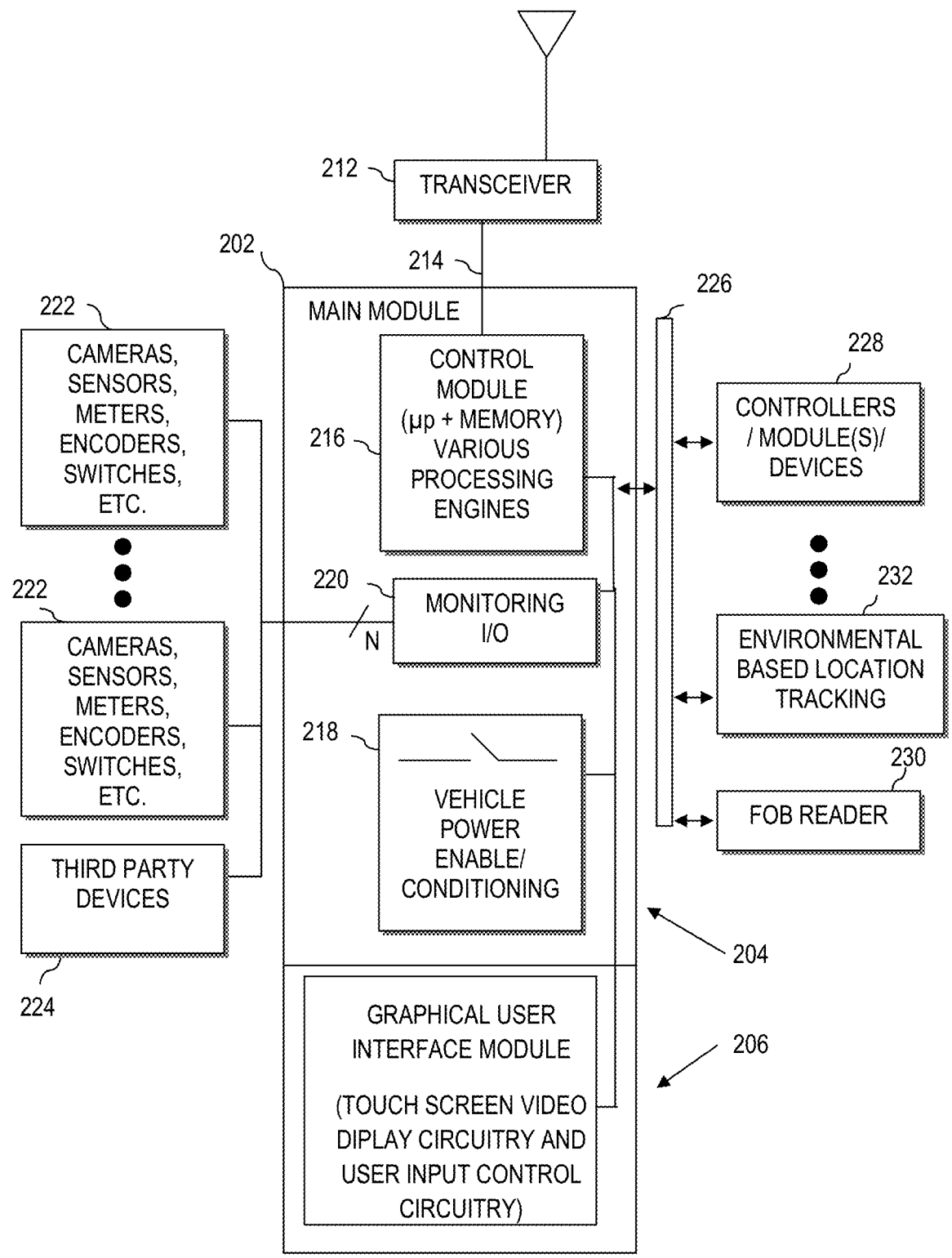
FIG. 2 is a block diagram of a special purpose processing device on an industrial vehicle, according to aspects of the present disclosure herein.

Industrial Vehicle:

Referring to FIG. 2, a processing device 202 is provided on an industrial vehicle 108. The processing device 202 is equivalent to and an example embodiment of the processing device 102 on the industrial vehicle 108 in FIG. 1. Here, the processing device 202 is a special purpose, particular hardware computer, such as a device that mounts to or is otherwise integrated with the industrial vehicle 108. The processing device 202 includes a processor coupled to memory to carry out instructions. However, the execution environment of the processing device 202 is further tied into the native electronics of the industrial vehicle 108 making it a particular machine different from a general purpose computer.

The illustrated processing device 202 is implemented as an information linking device that comprises the necessary circuitry to implement communication with a remote server, data and information processing for processing vehicle data, and wired (and optionally wireless) communication to components of the corresponding industrial vehicle 108 to which the processing device 202 is mounted.

According to aspects of the present disclosure, the processing device 202 is implemented as a main component 204 and a service component 206, which couple together to create an integrated device. The service component 206 is field-replaceable and includes a display (e.g., a LCD), a set of user input controls (e.g., a touch screen, buttons, switches, encoders, etc.), and any necessary data processing circuitry. In this regard, the service component 206 provides a graphical user interface to the processing device 202.

Figure 3A:
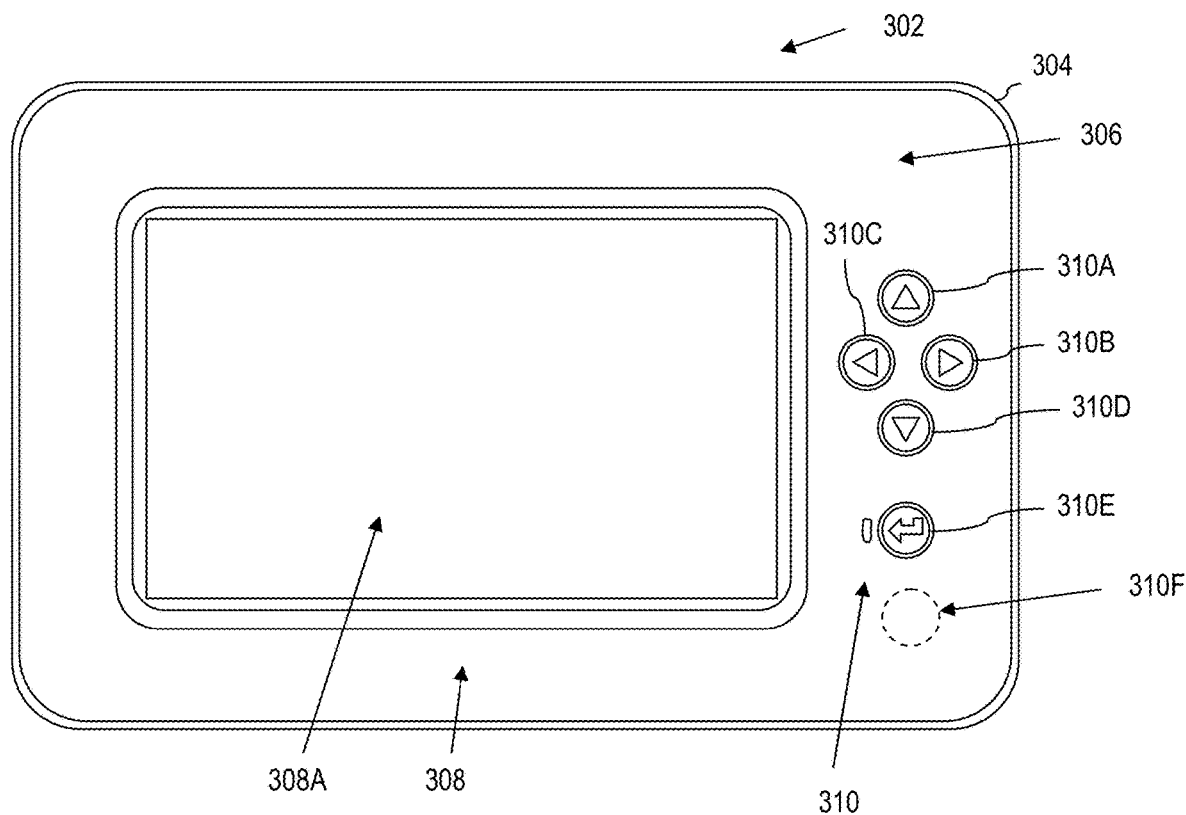
FIG. 3A is an illustration of the processing device of FIG. 2, implemented as a graphical user interface having a touch screen display and a corresponding vehicle operator control section, according to aspects of the present disclosure.

Graphical User Interface Component:

Referring briefly to FIG. 3A, a graphical user interface 302 is illustrated as an example implementation of the graphical user interface component 206 (FIG. 2). The graphical user interface 302 includes a housing 304 having a front face 306 defining a display section 308 and a vehicle operator control section 310. A touch screen display can be provided within the display section 308 of the front face 306 of the housing 304. Also, a set of controls is arranged within the vehicle operator control section 310 of the front face 306 of the housing 304.

For instance, a display 308A within the display section 308 can include for instance, a liquid crystal display (LCD) screen, a light emitting diode (LED) screen, a plasma screen, etc. Moreover, the display 308A can include the appropriate technology to implement a touch screen so as to respond to gesture controls implemented by touching the screen, pressing against or releasing from the screen, swiping across the screen, performing other gesture functions associated with the display, etc., (collectively referred to herein as gesture commands). As such the display can be a touch screen display 308A.

The vehicle operator control section 310 can include buttons, switches, sliders, encoders, knobs, voice recognition, keypad, other forms of receiving vehicle operator input, combinations thereof, etc.

For instance, in an example implementation, the set of controls 310 is collocated with the touch screen display 308A. For instance, the set of controls 310 is aligned to the right side of the touch screen display 308A as buttons arranged in a vertical proportion while still providing a navigational pattern logic to the set of controls 310.

As illustrated, the vehicle operator control section 310 includes an up control (first control), i.e., up direction button 310A, a right control (second control), i.e., a right direction button 310B, a left control (third control), i.e., a left direction button 310C, a down control (fourth control), i.e., a down direction button 310D, and a select control (fifth control), i.e., a select/enter button 310E.

Alternatively, or in addition to the above, the vehicle operator control section 310 can include additional input devices, such as an optional rotary encoder 310F. In an alternative embodiment, one or more of the buttons (e.g., the buttons 310B, 310C) can be replaced by the rotary encoder 310F or other suitable control element. For instance, a first control (e.g., right control) is implemented by rotating the encoder in a first direction (e.g., to the right) and the second control (left control) is implemented by rotating the encoder in a second direction (e.g., to the left) opposite the first direction.

The user input controls interact with, or control, elements in the graphical user interface as viewed on the display. As such, an operator of the industrial vehicle can interact with the processing device 202, e.g., to respond to requests for information, to set up, organize, customize, etc., widgets and other display elements, or otherwise provide feedback to the processing device 202.

Figure 3B:
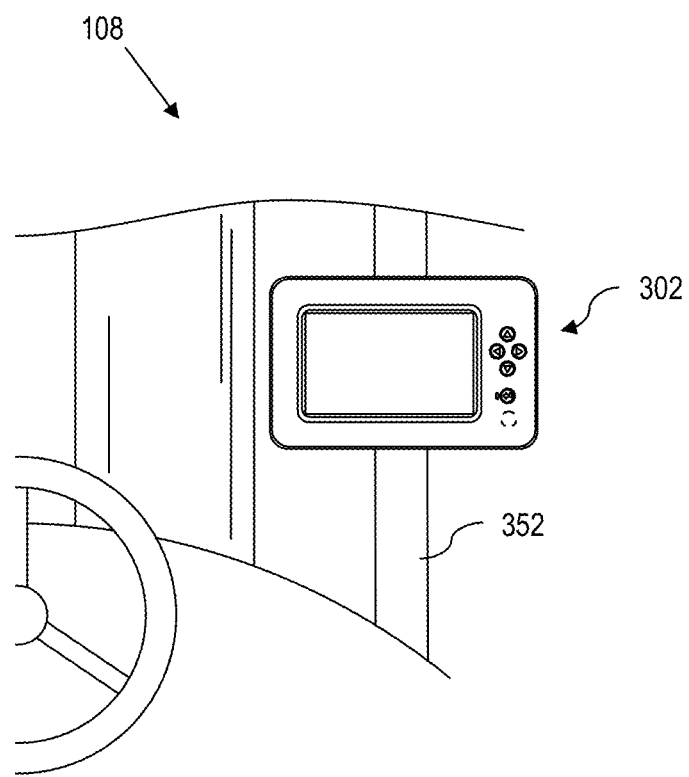
FIG. 3B is a schematic representation of the display of FIG. 3A mounted to an industrial vehicle such as a forklift truck.

Referring to FIG. 3B, the graphical user interface 302 of a corresponding processing device 202 is illustrated, mounted to a support bar 352 of an industrial vehicle 108 implemented as a sit down forklift for convenience of illustration. In practice, the graphical user interface 302 can be mounted in, on, to, integrated with, or otherwise provided for various types of industrial vehicles, including but not limited to a forklift truck, reach truck, stock picker, turret truck, tow tractor, rider pallet truck, walkie stacker truck, etc.). Here, the housing of the graphical user interface 302 can be mounted to the inside or outside of the corresponding industrial vehicle.

In this regard, the size, shape, and other physical characteristics can vary depending upon the application. For instance, if the housing of the graphical user interface 302 is mounted inside an industrial vehicle, the front face can conform to neighboring structures, e.g., instrument/control cluster, etc. If mounted to the industrial vehicle, e.g., to the support bar 352, mounts, a harness, and other supporting structures may be provided. As such, the processing device herein is adaptable to multiple mounting options for different industrial vehicle types and modes (with or without operator, i.e., operator controlled, semi-automated, fully automated, etc.)

In certain implementations, regardless of the form factor of the housing, the processing device maintains a constant relationship between the display 308A and vehicle operator control section 310 independent of the front face shape or housing size.

Main Component:

Referring back to FIG. 2, in an illustrative example, the processing device 202 is connected to a transceiver 212 for wireless communication. Although a single transceiver 212 is illustrated for convenience, in practice, one or more wireless communication technologies may be provided (e.g., WiFi, Bluetooth, and cellular). For instance, the transceiver 212 may be able to communicate with a remote server, e.g., server 112 of FIG. 1 via 802.11 across the access points 110 of FIG. 1. The transceiver 212 may also optionally support other wireless communication, such as cellular, Bluetooth, radio frequency (RF), infrared (IR) or any other technology or combination of technologies. For instance, using a cellular to IP bridge, the transceiver 212 may be able to use a cellular signal to communicate directly with a remote server, e.g., a manufacturer server. The transceiver 212 connects to the processing device 202 via a suitable electrical connection 214, e.g., an Ethernet connection. However, the transceiver 212 can connect to the processing device 202 using other connections. Alternatively, the transceiver 212 can be built in or otherwise integral with the processing device 202.

The processing device 202 also comprises data processing circuitry that implements a controller, e.g., illustrated as a controller 216. The controller 216 includes a processor coupled to memory for implementing computer instructions, including the relevant processes, or aspects thereof, as set out and described more fully herein. The controller 216 can also include other necessary processing circuitry and software, such as for implementing a display engine, camera processing engine, data processing engine(s), etc. In this regard, the controller 216 can include additional support circuitry, e.g., video ports, camera ports, input/output ports, etc. Moreover, the memory can include memory that stores processing instructions, as well as memory for data storage, e.g., to implement one or more databases, data stores, registers, arrays, etc. Additionally, the controller 216 implements processes such as operator log on, pre-use inspection checklists, data monitoring and other features, examples of which are described more fully in U.S. Pat. No. 8,060,400 to Wellman, the entirety of which is hereby incorporated by reference herein.

The processing device 202 can also optionally include vehicle power enabling circuitry 218 that is controlled by the controller 216 to selectively enable or disable the industrial vehicle 108 and/or selectively enable or disable select components of the industrial vehicle 108. In certain implementations, the controller 216 controls the vehicle power enabling circuitry 218 to partially enable the industrial vehicle for operation, or fully enable the industrial vehicle for operation, e.g., depending upon proper operator login. For instance, the industrial vehicle power enabling circuitry 218 can provide selective power to components via a suitable power connection, or otherwise command certain vehicle components not to respond to vehicle operator control via vehicle messaging, e.g., across one or more vehicle communication busses.

In certain implementations, the processing device 202 includes a monitoring input/output (I/O) component 220 to communicate via wired or wireless connection between peripheral devices mounted to or otherwise on the industrial vehicle, such as cameras, sensors, meters, encoders, switches, etc. (collectively represented by reference numeral 222) and the controller 216. The monitoring input/output (I/O) component 220 may also be connected to other devices, e.g., third party devices 224 such as RFID scanners, displays, meters, bar code scanners, cameras, or other devices to convey information to the controller 216.

The processing device 202 is coupled to and/or communicates with other industrial vehicle system components via a suitable industrial vehicle network system 226, e.g., at least one vehicle network bus. The industrial vehicle network system 226 is any wired or wireless network, bus or other communications capability (or combination of multiple, independent networks, busses or other communications capabilities) that allows electronic components of the industrial vehicle 108 to communicate with each other. As an example, the industrial vehicle network system 226 may comprise a controller area network (CAN) bus, ZigBee, Bluetooth, Local Interconnect Network (LIN), time-triggered data-bus protocol (TTP), RS422 bus, Ethernet, universal serial bus (USB), other suitable communication strategy, or combinations thereof.

For instance, the controller 216 can communicate with native vehicle electronic components such as controllers (hydraulic, traction, etc.), modules such as a battery monitor, devices such as impact sensors, etc. (collectively 228).

The controller 216 of the processing device 202 can also communicate with a fob 230 (or keypad, card reader or any other device) for receiving operator log in identification.

According to yet further aspects of the present disclosure, the processing device 202 can communicate with an environmental based location tracking device 232 that is provided on the industrial vehicle 108. The environmental based location tracking device 232 enables the industrial vehicle 108 to be spatially aware of its location within a local space, e.g., within a warehouse.

As will be described more fully herein, utilization of the industrial vehicle network system 226 enables seamless integration of the components of the industrial vehicle 108 with the processing device 202, and in particular, the controller 216. By way of example, the industrial vehicle network system 226 enables communication between the controller 216 and the native electronics including a vehicle control module, controllers (e.g., traction controller, hydraulics controller, etc.), vehicle specific modules and other electronic devices 228 of the industrial vehicle 108, a fob reader 230, environmental based location tracking 232, etc. Also, the controller 216 can facilitate the communication of information from any electronic peripheral devices 222 or third party devices 224 associated with the industrial vehicle 108 (e.g., via the monitoring I/O 220 bridging data to other vehicle resources) that integrate with and can communicate over the network system 226.

Thus for example, the processing device 202 connects with, understands and is capable of communication with native vehicle components, such as controllers, modules, devices, bus enabled sensors, displays, lights, light bars, sound generating devices, headsets, microphones, haptic devices, etc. (collectively referred to by reference numeral 228).

GUI Controller:

Referring generally to FIGS. 2, 3A and 3B, the controller 216 includes a hardware processor coupled to physical memory and is capable of carrying out computer-executed processes in a hardware system. In this regard, the processes, architectures and organizations described herein may be implemented on computer-readable hardware that stores machine-executable program code, where the program code instructs the processor to implement the described features.

The processor of the controller 216 executes the program code stored in the memory to implement a graphical user interface control architecture that passes information to, and receives information from the graphical user interface 302.

In particular, the controller 216 provides several distinct control functions, which all interact with, and impact the manner in which the graphical user interface module 206 (FIG. 2) presents and receives information via the display 308A when interacting with a vehicle operator. The features set out in simplified block diagram form, are executed by the controller 216 (FIG. 2).

Figure 4:
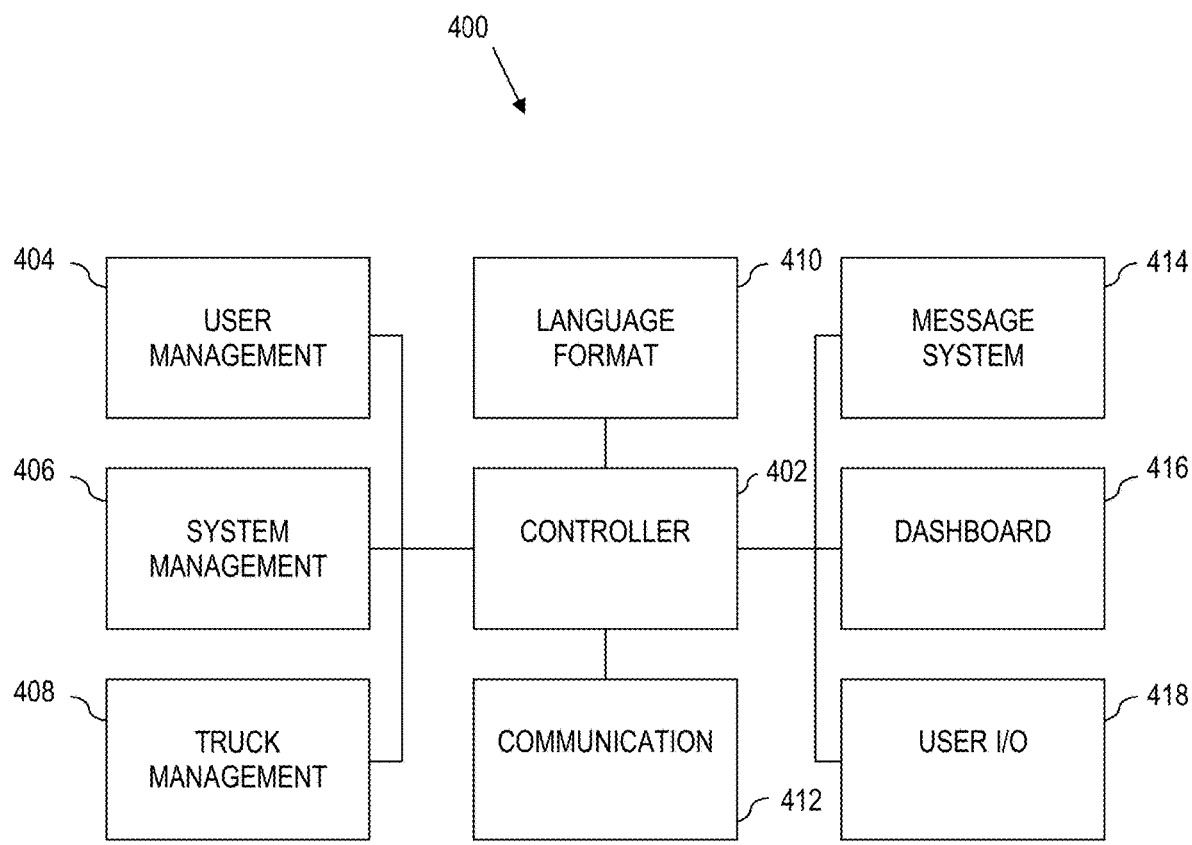
FIG. 4 is a block diagram of operational components executed by a processor of the special purpose processing device of FIG. 2.

Referring to FIG. 4, a control architecture 400 for a graphical user interface is illustrated. The control architecture 400 is executed in an illustrative example, by the controller 216 of FIG. 2 (microprocessor coupled to memory), and includes a graphical user interface (GUI) controller component 402 that controls a plurality of sub-algorithms (components) that affect the manner in which the processing device 202 interacts with the vehicle operator. In this regard, the GUI controller component 402 communicates with each sub-algorithm/component and further communicates with the graphical user interface module 206 (FIG. 2) to present information to the vehicle operator via the display 308A (FIG. 3A), and to receive information from the vehicle operator, e.g., via touch/gesture controls received through touching the display 308A (FIG. 3A) and/or interacting with a control within the vehicle operator control section 310 (FIG. 3A) of the graphical user interface 302 (FIG. 3A). In this regard, the GUI controller component 402, is also communicably connected to the touch screen display 308A and the set of controls 310 in the control section as described with reference to FIG. 3A.

In an example implementation, the GUI controller component 402 is operatively programmed to receive and process gesture commands from a vehicle operator touching or otherwise interacting with the display 308A (FIG. 3), such as via touch, press, release, swipe, scroll, gesture proximate to, etc. Received gesture commands can include a first touch gesture command implemented as an up swipe gesture command, a second touch gesture command implemented as a right swipe gesture command, a third touch gesture command implemented as a left swipe gesture command, a fourth touch gesture command implemented as a down swipe gesture command, and a fifth touch gesture command implemented as a select gesture command.

Likewise, the GUI controller component 402 is operatively programmed to receive and process vehicle operator inputs from the vehicle operator control section 310 (FIG. 3) of the graphical user interface. The set of controls include hardware control equivalents to the gesture commands recognized by the touch screen of the display.

For instance, the GUI controller component 402 maps and/or processes operation of a first control designated as an up control (e.g., via a vehicle operator pressing the up direction button 310A of FIG. 3), and the up swipe gesture command on the touch screen display, to trigger to a first graphical user interface command. That is, an up swipe gesture command implemented on the touch screen display and operation of a first control in the set of controls designated as an up control both map to a first graphical user interface command.

The GUI controller component 402 maps and/or processes operation of a second control designated as a right control (e.g., via a vehicle operator pressing the right direction button 310B of FIG. 3), and the right swipe gesture command, to trigger to a second graphical user interface command. That is, a right swipe gesture command implemented on the touch screen display and operation of a second control in the set of controls designated as a right control both map to a second graphical user interface command.

The GUI controller component 402 maps and/or processes a third control designated as a left control (e.g., via a vehicle operator pressing the left direction button 310C of FIG. 3), and the left swipe gesture command, to trigger to a third graphical user interface command. That is, a left swipe gesture command implemented on the touch screen display and operation of a third control in the set of controls designated as a left control both map to a third graphical user interface command.

The GUI controller component 402 maps and/or processes a fourth control designated as a down control (e.g., via a vehicle operator pressing the down direction button 310D of FIG. 3) and the down swipe gesture command, to trigger to a fourth graphical user interface command. That is, a down swipe gesture command implemented on the touch screen display and operation of a fourth control in the set of controls designated as a down control both map to a fourth graphical user interface command.

The controller component 402 maps and/or processes a fifth control designated as a select control (e.g., via a vehicle operator pressing the select/enter button 310E of FIG. 3) and the select gesture command to trigger to a fifth graphical user interface command. That is, a select gesture command implemented on the touch screen display and operation of a fifth control in the set of controls designated as a select control both map to a fifth graphical user interface command.

As noted in greater detail herein, the various controls (first through fifth) can be implemented on a single input device, e.g., a keypad, or via separate controls, e.g., discrete buttons, one or more encoders, etc.

The first graphical user interface command may comprise, for instance, a command to navigate a display of information provided in the display 308A of the graphical user interface vertically, e.g., navigate up one menu option or information screen, scroll up in an image that is too large to fit in the area of the display screen, to increment a value that the vehicle operator must provide as an input while interacting with the display screen, etc.

The second graphical user interface command may comprise, for instance, a command to navigate a display of information provided in the display 308A of the graphical user interface horizontally/laterally, e.g., to scroll across widgets (e.g., to expose new widgets or reveal hidden widgets), to drill across menus or menu option choices, navigate right one menu option, scroll to the right in an image that is too large to fit in the area of the display screen, to index or otherwise modify a data entry value that the vehicle operator must provide as an input while interacting with the display screen, etc.

The third graphical user interface command may comprise, for instance, a command to navigate a display of information provided in the display 308A of the graphical user interface horizontally/laterally, e.g., to scroll across widgets (e.g., to expose new widgets or reveal hidden widgets), to drill across menus or menu option choices, navigate left one menu option, scroll to the left in an image that is too large to fit in the area of the display screen, to index or otherwise modify a data entry value that the vehicle operator must provide as an input while interacting with the display screen, etc.

The fourth graphical user interface command may comprise, for instance, a command to navigate a display of information provided in the display 308A of the graphical user interface vertically, e.g., navigate down one menu option or information screen, scroll down in an image that is too large to fit in the area of the display screen, to decrement a value that the vehicle operator must provide as an input while interacting with the display screen, etc.

The fifth graphical user interface command enables the operator to select a menu option, enter a response, accept a value, trigger an action, clear a message, set or stop a timer, execute an enter command, execute a select command, enter an acknowledgement command, or otherwise interact with the information displayed in the graphical user interface or in an in-focus portion thereof.

The first, second, third, fourth, and fifth graphical user interface commands will thus vary in function depending upon what is currently being displayed on the display 308A, examples of which are described in greater detail herein.

However, the redundancy of the gesture controls generated by touching or otherwise interacting with the display 308A and using the corresponding controls (e.g., buttons 310A-310E) in the vehicle operator control section 310 facilitates operation of the processing device 202, even in harsh environments. For instance, some forklift operators wear gloves, such as where operating in refrigerated areas of a warehouse. Moreover, the positioning of the buttons in close proximity (on the same housing) as the display 308A facilitates operator interaction by keeping the operator consistently focused in a common area regardless of interaction with the screen or tactile controls (e.g., buttons) when interacting with the graphical user interface 302. Thus, in this configuration, the buttons are co-located with the touch screen of the display.

The GUI controller component 402 also facilitates customization of the user interaction experience. For instance, the GUI controller component 402 interacts with a user management component 404. The user management component 404 is responsible for storing personalized settings that are passed from the controller 216, such as information where read in response to an operator logging into a corresponding industrial vehicle via the FOB reader 230 of FIG. 2, or via logging onto the vehicle using the graphical user interface 302. In an illustrative example, the user management component 404 is used to store a vehicle operator performance tuning level, a theme preference, a language preference, unit measurement preference (e.g., metric or English), widget arrangement, etc. A generic template can be provided where there is no customization data available for a specific vehicle operator.

The themes may be set or limited based upon a vehicle operator level, truck level, company level, etc. Moreover, the user-selected theme can be temporarily overridden for certain vehicle specific functionality, e.g., to provide an inspection checklist, to provide certain diagnostic information, etc. For instance, a system supervisor may decide to not allow theme customization, and can thus lock out that feature from appearing as a user settable parameter.

The GUI controller component 402 also communicates with a system management component 406. The system management component 406 can be utilized to control the allowable operator-specific settings, e.g., by limiting, disabling, enabling, etc., features. For instance, in an example implementation, the system management component 406 controls the ability of the vehicle operator to configure themes, language preference, widget arrangement, widget customization, etc.

The GUI controller component 402 still further communicates with a truck management component 408. The truck management component 408 controls information about the specific industrial vehicle 108 to which the processing device 202 is installed. For instance, the truck management component 408 can include information about the maximum fork height, maximum weight, battery charge, or other vehicle specific characteristics.

The GUI controller component 402 still further communicates with a language format component 410, which can be used to set a preferred language for the display of text on the display 308A. In particular, the language format component 410 manages the strings that need to be translated to be pushed to the display 308A, font, text alignment, direction, and other features that affect readability of the desired information by the vehicle operator.

The GUI controller component 402 still further interacts with a communication component 412, which controls the communication of the GUI controller component 402 with other vehicle controllers, modules, devices, sensors, third party devices, etc., as set out in regard to FIG. 2.

The GUI controller component 402 further interacts with a message system component 414. The message system component 414 not only controls the messaging that is presented to the vehicle operator, but also the manner in which the messaging is presented to the vehicle operator, as will be described in greater detail herein.

The GUI controller component 402 also communicates with a dashboard component 416. The dashboard component 416 controls widgets, the widget order, and the menu systems that are presented on the display 308A (FIG. 3). Moreover, the dashboard component 416 is responsible for screen management, e.g., by storing the current screen, next screen, previous screen, etc. The dashboard component 416 also tracks the menus, calibration, checklists, widget display, messaging, text and video messaging, etc.

The GUI controller component 402 also can communicate with a user I/O component 418 to translate the vehicle operator provided inputs into instructions that are interpreted to facilitate a vehicle operator interaction experience when interacting with the graphical user interface 206, 306. For instance, the user I/O 418 can process the touch gesture commands from a vehicle operator touching the display 308A (FIG. 3), or the vehicle operator-operated section of controls within the vehicle operator control section 310 (e.g., button presses), as described in greater detail above.

Widget Customization:

According to aspects of the present disclosure, the display (e.g., 308A of FIG. 3) can be utilized to display one or more "widgets". Each widget can represent operating conditions and/or state, environmental conditions and/or state, operator conditions and/or state, combination thereof, etc. For instance, a widget can present the current state of a feature of the industrial vehicle (e.g., battery charge), the current state of a vehicle function or operation (e.g., current vehicle speed), or the current state of some ancillary condition (e.g., environmental condition such as the current time).

For instance, in an example implementation, widgets are used to represent the current state of the vehicle speed, fork height, load weight, battery charge, clock, stop watch, odometer, trip meter, hour meter, time, date, etc. In this regard, the widgets represent "live" data. The current state of data values can be obtained for instance, by the processor of the controller 216 communicating with either a master state data repository on the industrial vehicle 108 (e.g., where the current state of monitored functions is aggregated into a common location), or by communicating (e.g., querying, polling, reading from, etc.) with specific vehicle control modules, sensors, etc., across the vehicle network system 226, via the monitoring I/O 220, or a combination thereof. Also, the current state data can be ascertained by polling or otherwise querying a remote server, e.g., the server 112 described with reference to FIG. 1, which extracts relevant data from the industrial vehicle data repository 116 and communicates that relevant data back to the controller 216.

A widget can also represent an operator based metric, such as a current state of a task or operation reflecting the level of completion of the task, (e.g., percentage of picks per shift), the current state of an operator-based metric (e.g., operator skill level), a level of correct vehicle operation or environmental behaviors, etc. As with the above, the current state of data values can be obtained for instance, by the processor of the controller 216 communicating with either a master state data repository on the industrial vehicle 108, or by communicating with specific vehicle control modules, sensors, etc., across the vehicle network system 226, via the monitoring I/O 220, or combination thereof. Also, the current state data can be ascertained by polling or otherwise querying a remote server, e.g., the server 112 described with reference to FIG. 1, as noted above.

By way of example, by continually data logging operator-based performance/operation data, e.g., at the server 112 of FIG. 1, widgets can provide a dashboard view of key vehicle and/or operator performance measures. In this regard, the overall data provided in a widget need not be limited to data collected by a specific vehicle. The widget can reflect all of the relevant industrial vehicle data associated with the operator logged into the industrial vehicle, regardless of which industrial vehicle the operator is currently operating.

As noted in greater detail above, the processing device 202 is communicably connected to, or is otherwise integrated with a communications device (e.g., transceiver 212) such that the processing device receives from a remote server (e.g., server 112), information that is displayed in a widget space that includes information not extracted from the vehicle 108.

Widgets can also be utilized to present industrial vehicle operator performance feedback to the vehicle operator. For instance, a widget can show incorrect vs. correct defined warehouse operational behaviors, e.g., proper use of stop and horn at the end of aisles, proper use of speed zones, etc. By way of illustration, a widget can count the frequency and/or duration of correct behavior events in-between incorrect behavior events. In this regard, information such as skill level, current streak, progress meter, badges, etc., can be integrated into a "grouped" widget, or the displayed information can be simplified to a single metric.

According to yet further aspects of the present disclosure herein, widgets can tie into third party databases to display other information, such as operational information, messages, information from a warehouse management system, feeds (such as from news, sports, weather, etc.).

Figure 5:
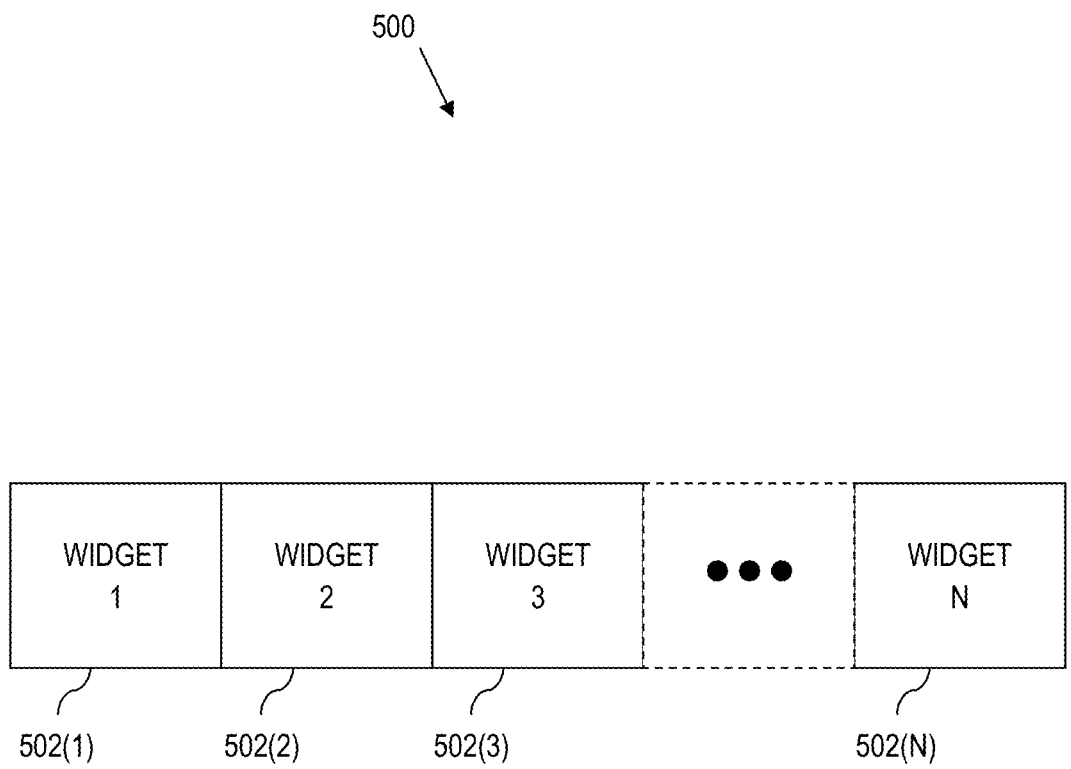
FIG. 5 is a schematic diagram illustrating an array of widget for display on the touch screen display of FIG. 3, according to aspects of the present disclosure.

Widget Organization:

Referring to FIG. 5, widgets are organized into an array 500. The array 500 dictates which widgets will be presented, and in which order the widgets will be presented. For instance, a first widget 502(1) is set to the leftmost widget, followed by widgets 502(2), 502(3) . . . 502(n), where n is any reasonable number. The vehicle operator can add as many widgets as are available, or as are limited via preferences set in the system management 404 (FIG. 4). Moreover, the vehicle operator can re-arrange the order of presentation of the widgets so that the widgets are appropriately ordered. The first two widgets can be used to set a "Home Screen" that the device can quickly jump to, e.g., to normally display the two most important measures to the vehicle operator. Yet further, the widgets can be configured and ordered from the screen itself, e.g., by the vehicle operator, or the widgets can be set/preset by a manager or via a remote computer, which wirelessly sends the widgets and widget order to the vehicle, such as through the remote server 122 of FIG. 1.

Figure 6:
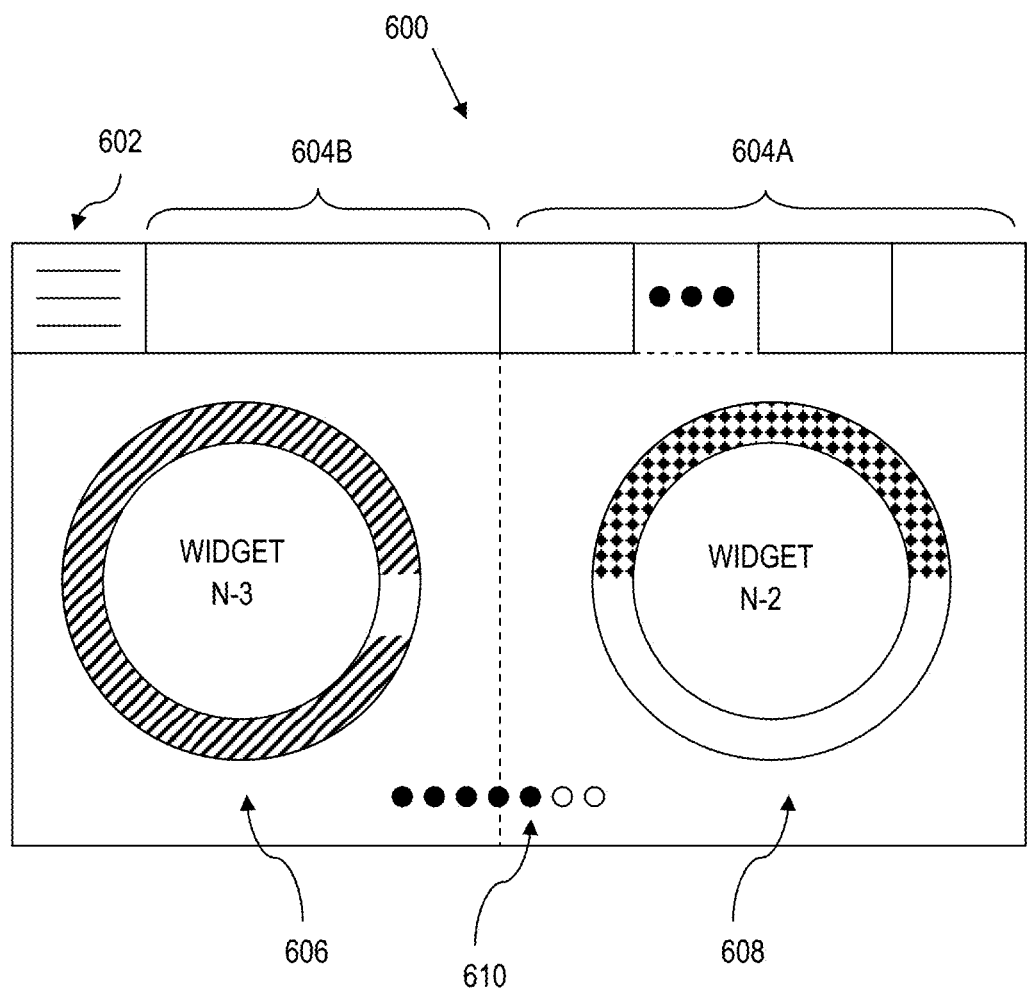
FIG. 6 is a schematic screen shot of a screen display for presentation on the touch screen display of FIG. 3, according to aspects of the present disclosure.

Graphical User Interface Display Screen:

Referring to FIG. 6, an example display screen 600 is illustrated. The display screen 600 is an example of a graphical user interface display as presented by the display 308A (FIG. 3). The display screen 600 is conceptually broken down into a menu selection section 602, a first docked status tray 604A, an optional second docked status tray 604B, a widget space, e.g., illustrated as a first widget space 606 and a second widget space 608 in this example. In practice, the display screen size may dictate the number of widget spaces available. As such, aspects herein are not limited to two widgets per screen.

The menu selection section 602 can be used to access a drop down set of menus, e.g., to set up/configure the widgets, to set preferences, etc.

The first docked status tray 604A is used to dock a limited number (e.g., 1 to 6) of specific system status icons that are frozen on the screen regardless of which widgets are displayed. The current status of each vehicle status associated with a docket icon is presented. Thus, necessary maintenance required, operator performance tuning level, battery charge, time, a mailbox, a home button etc., can be frozen so that the vehicle operator can normally see the current state of each docked feature and access these features regardless of which widgets are being displayed.

The second, optional docked status tray 604B can be used to display an identifier, e.g., the vehicle operator name or name of another person actively logged into the vehicle, truck name, company name, location, etc.

Each widget space presents a widget comprising a visual representation of the current state of an associated function. In the illustrative example, two adjacent widgets are displayed, e.g., according to the order set by the array 500. Thus, since widget N-3 is displayed in the first widget space 606, then widget N-2 is displayed in the second widget space 608. Scrolling the widgets over to the right would shift widget N-3 into the second widget space 608 and would shift a new widget N-4 into the first widget space 606. Likewise, scrolling the widgets over to the left would shift the widget N-2 into the first widget space 606 and shift widget N-1 into the left widget space 608. This process can continue to scroll through the assigned widgets. At widget 1 and N, the scrolling can stop or wrap around. An optional widget position indicator 610 can be utilized to determine the number and position of the displayed widgets.

In an example implementation, a vehicle operator can only swipe or key to a different widget when the vehicle is at a full stop. When the travel controls of the vehicle are engaged, the display screen "snaps" back to a designated "home" position, such as the first two widgets. Moreover, the graphical user interface may be configured to have multiple "home" screens, such as to have a home screen for travel and a home screen for lift operations. Each designated home screen displays one or more widgets that are relevant to the task at hand, e.g., travel, lift, etc. For instance, when traveling, the display can automatically change to a motion home screen that shows relevant travel related widgets, e.g., speed and battery charge. Similarly, when performing a lift operation, the display can automatically change to a lift home screen that shows relevant widgets, e.g., a capacity data monitor, e.g., by providing lift height, weight, rack selection, informational messages, blending information, etc.

As a few illustrative examples, the controller 216 is communicably coupled to vehicle system modules via the vehicle network system 226. As such, the controller extracts from a traction control module 228 (e.g., directly or via a memory/current vehicle state lookup table), an indication as to whether the traction control is engaged. If the current operating state of the traction control module indicates that the traction controls are engaged, the controller causes the display screen to "snap" back to a designated "home" position. Otherwise, the vehicle operator can scroll through the available widgets.

As an illustrative implementation, the controller extracts from a traction control module, an indication as to whether the traction control is engaged on the industrial vehicle, and where the current operating state of the traction control module indicates that the traction controls are engaged, the controller causes the display screen to snap to a designated motion home position. Also, the controller extracts from a hydraulic module, an indication as to whether the forks are engaged in a lift operation on the industrial vehicle, and where the current operating state of the forks are engaged in a lift operation, the controller causes the display screen to snap to a designated lift home position.

In another example, the controller extracts a speed of the vehicle based upon information read from the vehicle network bus and selectively disables operation of the touch gesture commands (and optionally disables the operator controls in the control area 310) when the industrial vehicle exceeds a predetermined speed.

In yet another example, the controller (e.g., controller 216) extracts a speed of the vehicle based upon information read from the vehicle network bus and selectively disables the display of the touch screen when the industrial vehicle exceeds a predetermined speed.

As noted above, the controller of the controller 216 can extract information by communicating across the vehicle network system 226 (or monitoring I/O 220) directly with a vehicle component. Alternatively, the controller can read the current state from a designated memory on the industrial vehicle. For instance, a process on the industrial vehicle (e.g., a process executed by the controller/processor in the controller 216) may be tasked with cyclically collecting and refreshing vehicle state information in the designated memory, e.g., every 100 milliseconds or less. The designated memory thus defines a vehicle state lookup table that can be accessed to make decisions based upon the current operating state of the industrial vehicle. The vehicle state information can be the current state of controllers, sensors, monitors, operator controls, etc. Here, the current state can reflect event codes, component states, component status information, hour meter readings, energy measurements, hydraulic measurements or other relevant data that is associated with a corresponding industrial vehicle. Moreover, this information can be used to create a history of operational data that may vary over time, such as vehicle speed, vehicle temperature, battery state of charge, vehicle proprietary service codes, height, weight and other measurable parameters associated with the load carrying features of the industrial vehicle, operator information, etc.

Messaging:

From time to time, it may be necessary to interrupt the presentation of information on the display 308A to provide instructions, warnings, and other suitable messages to the vehicle operator. In this regard, the graphical user interface 206 (FIG. 2) can support the display of messages in appropriate circumstances. For instance, messages can be organized into various levels, e.g., information, warning, alert, etc. Moreover, displayed messages can persist for a predetermined amount of time, until a vehicle operator clears the message (by pressing the screen or button in the control section 310), until overridden by a more important message, or until cleared by the vehicle, e.g., due to excess vehicle speed or other task where the display content is deemed a distraction.

Figure 7:
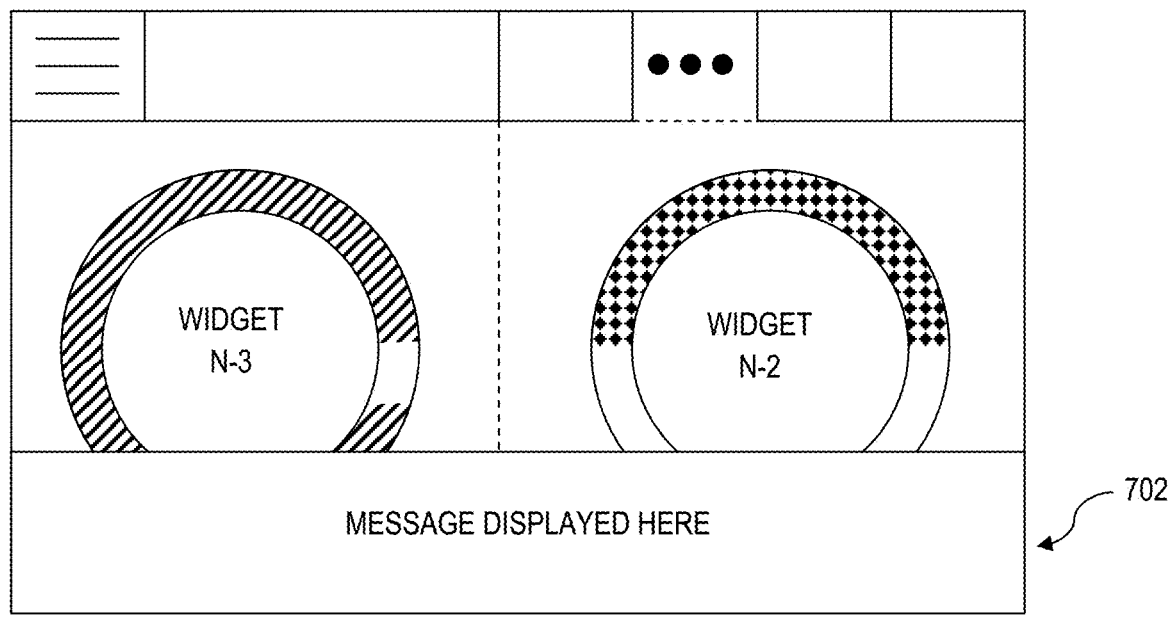
FIG. 7 is a schematic screen shot of a screen display with first message type for presentation on the touch screen display of FIG. 3, according to aspects of the present disclosure.

Referring to FIG. 7, in a first example, a message bar 702 can be displayed across the bottom of the display screen so as to only partially block the lower portion of each displayed widget. Notably, here, the docked icons in the docked status tray 604 are not obscured.

Figure 8:
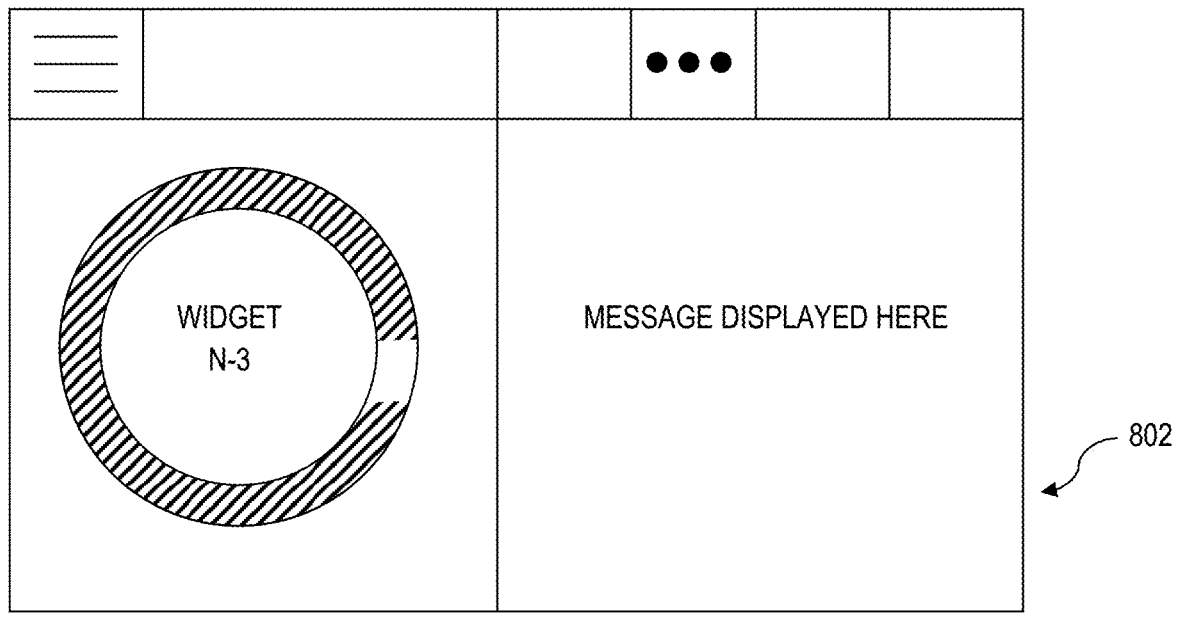
FIG. 8 is a schematic screen shot of a screen display with second message type for presentation on the touch screen display of FIG. 3, according to aspects of the present disclosure.

Referring to FIG. 8, in an alternative example, an entire widget space can be temporarily covered up with a message. For instance, in the example implementation, the right-most widget window is temporarily over-ridden with a message. Once the message is cleared, either automatically (times out) or cleared by the vehicle operator, the underlying widget becomes visible again. Again, here, the docked icons in the docked status tray 604 are not obscured.

Figure 9:
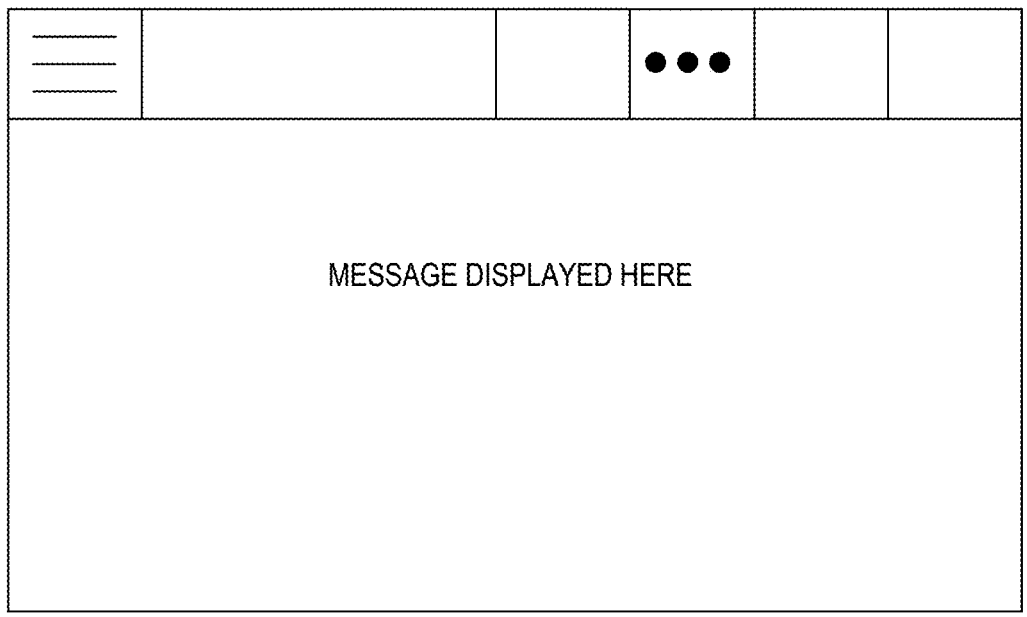
FIG. 9 is a schematic screen shot of a screen display with third message type for presentation on the touch screen display of FIG. 3, according to aspects of the present disclosure.

Referring to FIG. 9, in yet another illustrative example, all viewable widget spaces are temporarily over-ridden with a message. Once the message is cleared, either automatically (times out) or vehicle operator clears the message by pressing a button, e.g., the select button to acknowledge the message, the underlying widget(s) becomes visible again. Yet again however, the docked icons in the docked status tray 604 are not obscured.

Figure 10:
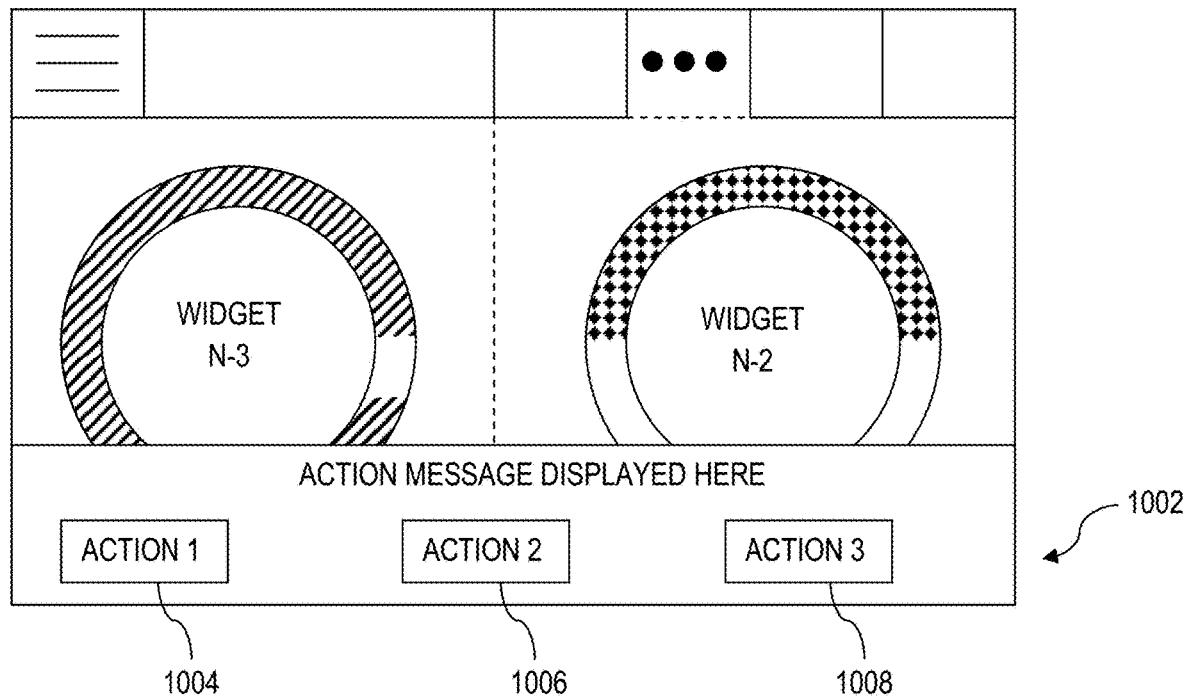
FIG. 10 is a schematic screen shot of a screen display with fourth message type for presentation on the touch screen display of FIG. 3, according to aspects of the present disclosure.

Referring to FIG. 10, yet another example message is displayed. Here, the message temporarily covers the bottom portion of the widget window(s) in a manner analogous to that set out with regard to FIG. 7. However, in addition to providing a message, the system requires the vehicle operator to provide feedback, e.g., by selecting an appropriate action, Action 1 icon 1002, Action 2 icon 1004, Action 3 icon 1006 in this example. More or less options can be provided. Moreover, the vehicle operator may be required to provide information, e.g., by filling in a field using a keypad, etc.

In general, the messages can be task-based messages. For instance, a maintenance message may instruct the operator to return the industrial vehicle to a service bay. A battery message may instruct the vehicle operator to return the industrial vehicle to a battery charging station, etc.

The messaging may also be vehicle operation specific, e.g., a warning that the vehicle operator is traveling too fast, is traveling in or near a restricted area such as a bonded area, traveling too close to the loading dock, etc.

Figure 11:
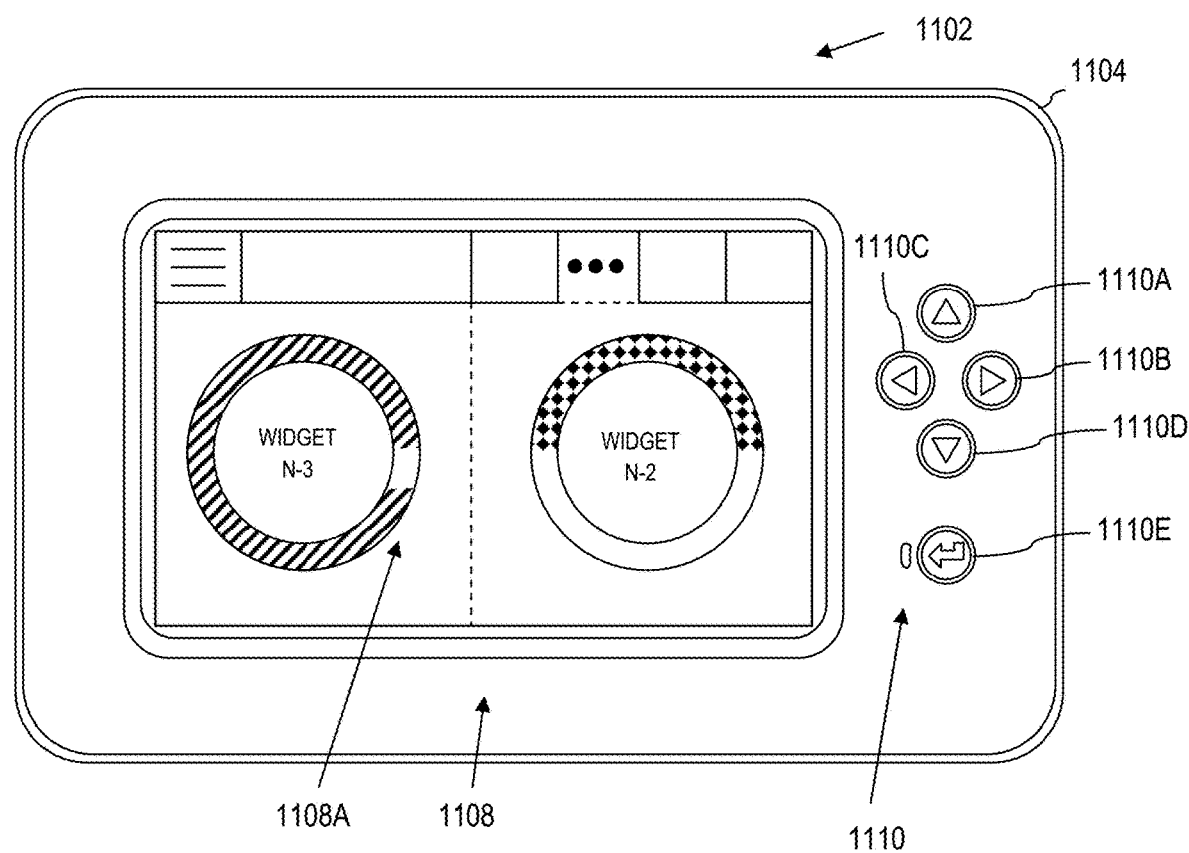
FIG. 11 is a schematic illustration of the processing device of FIG. 3 displaying widgets according to aspects of the present disclosure herein.

Example Graphical User Interface Device:

Referring briefly to FIG. 11, a graphical user interface 1102 is analogous to the graphical user interface component 206 (FIG. 2) and graphical user interface 302 (FIG. 3). The graphical user interface 1102 includes a housing 1104 having a front face 1106 defining a display section 1108 and a vehicle operator control section 1110. A display 1108A within the display section 1108 (e.g., touch screen) illustrates the display of two widgets, as described with reference to FIGS. 5-10.

The vehicle operator control section 1110 is illustrated as including five keys/buttons. For instance, as illustrated, the vehicle operator control section 1110 includes an up direction button 1110A, a right direction button 1110B, a left direction button 1110C, a down direction button 1110D, and an enter button 1110E.

Vehicle Operation Controlled Display of Information:

According to aspects of the present disclosure, the operating state of the industrial vehicle can be used to selectively modify, lock out, change, or otherwise modify the information viewable on the display. For instance, with reference generally to FIGS. 2, 3A, and 4, and as noted in greater detail herein, the GUI controller component 402 (e.g., via the controller 216) can communicate with vehicle components across the vehicle network system 226. As such, in an illustrative implementation, the controller extracts an event, such as a speed of the vehicle, fork height, load weight, load contents, etc., and based upon information read from the vehicle network system, selectively modifies, controls, augments, disables, etc., operation of the touch gesture commands and/or operator controls in the controls section 310 when the industrial vehicle exceeds a predetermined threshold associated with the event. Any number of events and thresholds can be detected and used to modify the performance of the graphical user interface in any desired combination.

As yet another example, the controller can extract speed of the vehicle based upon information read from the vehicle network system, and selectively disables the display of the touch screen, e.g., to hide the widgets, when the industrial vehicle exceeds a predetermined speed. As still another example, the system can disable tap and swipe (as well as key entered information) unless the vehicle is at a stop. As another example, when the vehicle starts to travel, the dashboard can transition back to the first two widgets, e.g., implementing a return to Home Screen functionality.

Calibration:

With reference to the FIGURES generally, the graphical user interface 206 can be used to walk a vehicle operator through a calibration process, e.g., to calibrate one or more vehicle functions, e.g., to set time/date, to calibrate load sensors, set operation set points, etc.

Operator Login:

The display screen can present a vehicle operator login prompt. If the vehicle operator fails to provide a proper operator ID, the controller 402 of the processing device 202 can communicate with the power enabling and conditioning circuitry 218 to temporarily disable all or part of the vehicle (e.g., limit travel speed to a limp mode/crawl), etc. The interaction between the control component 402 and the power enabling and control circuitry 218 also enables a "push to start" feature to start the industrial vehicle for normal operation by pressing a special button graphically displayed in the graphical user interface.

Messages:

The robustness of the graphical user interface, in combination with the integration of the processor to vehicle operator login, and communication with a remote server facilitates the ability to send and receive electronic messages to the vehicle operator. At appropriate times, e.g., when the industrial vehicle is not moving, the message contents can be directed to the graphical user interface. If an event is detected, such as the industrial vehicle moving, lifting or otherwise working, the messages can be automatically disabled. A message icon can be one of the docked icons in the docket status tray 604.

Rich Display Screen:

At designated times, e.g., when the industrial vehicle is not moving, the graphical user interface can also be utilized to display rich, graphic intensive information, such as operators manuals, maintenance repair manuals, schematics for maintenance personnel, etc. Where an image, text, etc. is too large to fit into the viewing area of the display screen, the user can use the controls to navigate up, down, left and right to move parts of the image, text, etc., into the viewable area of the display screen.

Miscellaneous:

In an example implementation, the processing device includes a vehicle network bus connection, e.g., a connection to the vehicle network system/bus 226 of the industrial vehicle as best described with reference to FIG. 2.

In an example implementation, the controller is further operatively programmed to extract a speed of the vehicle based upon information read from the vehicle network bus, and selectively disable operation of at least one gesture command when the extracted speed exceeds a predetermined speed threshold. The controller can also disable operation of at least one control (e.g., on button). Moreover, all user inputs (gesture commands and controls) can be disabled, or any combination thereof can be disabled.

In another example implementation, the controller is further operatively programmed to extract a speed of the vehicle based upon information read from the vehicle network bus, and selectively disable the display of the touch screen when the extracted speed exceeds a predetermined speed threshold.

In yet another example implementation, the touch screen display graphically displays a widget space for displaying a widget comprising a visual representation of a current state of an associated component of the industrial vehicle. Here, the controller is further operatively programmed to extract the current state of the associated component of the industrial vehicle by communicating with at least one electronic component across the vehicle network bus.

Moreover, as noted in the examples above, in example configurations, the touch screen display further graphically displays a menu selection section, and a docked status tray that graphically displays at least one icon, each icon representing the current state of a vehicle component. Here, the controller is further operatively programmed to periodically extract the current state of each vehicle component associated with an icon in the docked status tray by submitting a query across the vehicle network bus to at least one industrial vehicle electronic component. For instance, the widget space can display the current state of at least one of battery charge, vehicle speed, or fork lift height.

As another example, the controller can be further operatively programmed to receive information from another component of the industrial vehicle (e.g., a transceiver in communication with a remote server, memory, query engine, etc.), and interact with the touch screen display to cause the widget space to display the current state of at least one of environmental state, and a task-based state reflecting the level of completion of the task. For instance, the controller can interact with a communications device such that the controller receives from a remote server, information that is displayed in the widget space that includes information not extracted from the vehicle.

Likewise, the controller can be further operatively programmed to receive information from another component of the industrial vehicle (e.g., the transceiver in communication with a remote server) and interact with the touch screen display to cause the widget space to display the current state of at least one measure of operator performance. As an example, the controller can be operatively programmed to cause the touch screen display to display a count of the frequency and/or duration of correct behavior events in-between incorrect behavior events.

In still a further example, the controller can be further operatively programmed to receive information from another component of the industrial vehicle, and interact with the touch screen display to cause the widget space to be temporarily interrupted to display a message across a lower portion of the widget space that is removed after a period of time.

In addition and/or alternatively, the controller can be further operatively programmed to receive information from another component of the industrial vehicle, and interact with the touch screen display to cause the widget space to be temporarily interrupted to display a message across the entirety of a single widget space that is removed after a period of time. In addition and/or alternatively, the controller can be further operatively programmed to receive information from another component of the industrial vehicle, and interact with the touch screen display to temporarily display a message across the entirety of all displayed widget spaces for a period of time.

In yet further example configurations, the controller is operatively programmed to clear the displayed message after any one of the vehicle operator presses a designated area of the touch screen, a button in the vehicle operator control area, or a combination thereof, the message times out, the message is cleared to display a higher priority message, or the message is cleared to clear the display screen based upon a designated operating characteristic of the vehicle. For instance, the controller can be operatively programmed to clear the message from the display screen based upon a designated operating characteristic of the vehicle if the controller detects that the industrial vehicle is traveling in excess of a predetermined speed.

In example configurations the controller controls the touch display screen such that the widget space snaps to a first home position displaying at least one designated widget when the vehicle is not stationary. In other example configurations, the controller controls the touch display screen such that the widget space snaps to a first home position displaying at least one designated widget when the vehicle traction control is engaged. As an example, the controller extracts from a traction control module, an indication as to whether the traction control is engaged on the industrial vehicle, and where the current operating state of the traction control module indicates that the traction controls are engaged, the controller causes the display screen to snap to a designated home position.

In yet another example configuration, the controller controls the touch display screen such that the widget space snaps to a second home position displaying at least one designated widget when the vehicle lift control is engaged.

As yet another example, the controller extracts from a traction control module, an indication as to whether the traction control is engaged on the industrial vehicle, and where the current operating state of the traction control module indicates that the traction controls are engaged, the controller causes the display screen to snap to a designated motion home position. Also, the controller extracts from a hydraulic module, an indication as to whether the forks are engaged in a lift operation on the industrial vehicle, and where the current operating state of the forks are engaged in a lift operation, the controller causes the display screen to snap to a designated lift home position.

Figure 12:
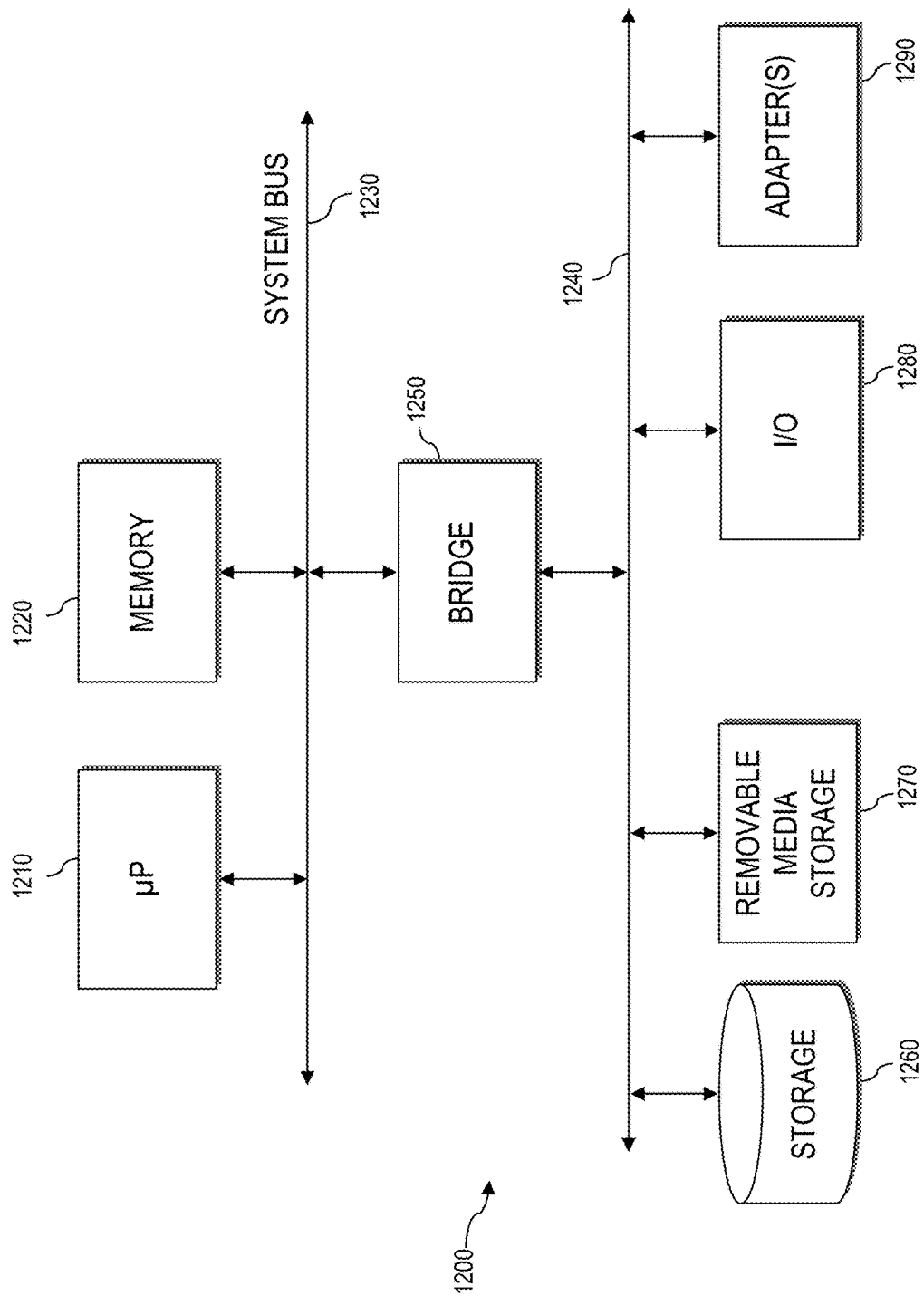
FIG. 12 is a block diagram of a computer processing system capable of implementing any of the systems, components, or processes described more fully herein.

Computer System Overview:

Referring to FIG. 12, a schematic block diagram illustrates an exemplary computer system 1200 for implementing the processing device of FIG. 2, the controller 216 of FIG. 2, the control architecture 400 of FIG. 4, or other processing structures set out more fully herein. The exemplary computer system 1200 includes one or more (hardware) microprocessors (g) 1210 and corresponding (hardware) memory 1220 (e.g., random access memory and/or read only memory) that are connected to a system bus 1230. Information can be passed between the system bus 1230 and an optional data bus 1240 by a suitable bridge 1250. The data bus 1240 is used to interface peripherals with the one or more microprocessors (μP) 1210, such as storage 1260 (e.g., solid state hard disk drive); removable media storage devices 1270 (e.g., flash drives, etc.); I/O devices 1280 (e.g., the graphical user interface 206, a universal serial bus (USB) interface, etc.); and one or more adapters 1290. The adapters 1290, where provided, allow the microprocessor 1210 to communicate across one or more of the vehicle network systems (e.g., 226 of FIG. 2). In this regard, example adapters 1290 can include Bluetooth, Ethernet, CAN bus, RS422, LIN Bus, WIFI, cellular, etc.

The above list of peripherals is presented by way of illustration, and is not intended to be limiting. Other peripheral devices may be suitably integrated into the computer system 1200. The memory 1220, storage 1260, removable media insertable into the removable media storage 1270 or combinations thereof, can be used to implement the processes, configurations, interfaces and other aspects set out and described herein.

The microprocessor(s) 1210 control operation of the exemplary computer system 1200. Moreover, one or more of the microprocessor(s) 1210 execute computer readable code that instructs the microprocessor(s) 1210 to implement the processes herein. The computer readable code may be stored for instance, in the memory 1220, storage 1260, removable media storage device 1270 or other suitable tangible storage medium accessible by the microprocessor(s) 1210. The memory 1220 can also function as a working memory, e.g., to store data, an operating system, etc.

The processes herein may be implemented as a machine-executable process executed on a computer system, e.g., one or more of the processing devices 102 of FIG. 1, on a particular computing device such as the vehicle computer processing device 202 described with reference to FIGS. 2-11, on the control architecture 400 of FIG. 4, on a system 1200 of FIG. 12, or combination thereof. In this regard, the processes herein may be implemented on a computer-readable storage device (e.g., computer-readable storage hardware) that stores machine-executable program code, where the program code instructs a processor to implement the described method/process. The processes herein may also be executed by a processor coupled to memory, where the processor is programmed by program code stored in the memory, to perform the described process.

Computer program code for carrying out operations for aspects of the present invention may be written in any combination of one or more programming languages. The program code may execute entirely on the computer system 1200 or partly on the computer system 1200. In the latter scenario, the remote computer may be connected to the computer system 1200 through any type of network connection, e.g., using the network adapter 1290 of the computer system 1200.

In implementing computer aspects of the present disclosure, any combination of computer-readable medium may be utilized. The computer-readable medium may be a computer readable signal medium, a computer-readable storage medium, or a combination thereof. Moreover, a computer-readable storage medium may be implemented in practice as one or more distinct mediums.

A computer-readable signal medium is a transitory propagating signal per se. A computer-readable signal medium may include computer readable program code embodied therein, for example, as a propagated data signal in baseband or as part of a carrier wave. However, specifically, a computer-readable signal medium does not encompass a computer-readable storage medium.

A computer-readable storage medium is a tangible device/hardware that can retain and store a program (instructions) for use by or in connection with an instruction execution system, apparatus, or device, e.g., a computer or other processing device set out more fully herein. Notably, a computer-readable storage medium does not encompass a computer-readable signal medium. Thus, a computer readable storage medium, as used herein, is not to be construed as being transitory signals per se, such as radio waves or other freely propagating electromagnetic waves through a transmission media.

Specific examples (a non-exhaustive list) of the computer-readable storage medium include the following: a hard disk, a random access memory (RAM), a read-only memory (ROM), an erasable programmable read-only memory (EPROM), Flash memory, or any suitable combination of the foregoing. In particular, a computer-readable storage medium includes computer-readable hardware such as a computer-readable storage device, e.g., memory. Here, a computer-readable storage device and computer-readable hardware are physical, tangible implementations that are non-transitory.

By non-transitory, it is meant that, unlike a transitory propagating signal per se, which will naturally cease to exist, the contents of the computer-readable storage device or computer-readable hardware that define the claimed subject matter persists until acted upon by an external action. For instance, program code loaded into random access memory (RAM) is deemed non-transitory in that the content will persist until acted upon, e.g., by removing power, by overwriting, deleting, modifying, etc.

Moreover, since hardware comprises physical element(s) or component(s) of a corresponding computer system, hardware does not encompass software, per se.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A processing device having a graphical user interface, the processing device comprising:
    a housing having a front face, the front face defining a control section and a display section;
    a touch screen display within the display section of the front face of the housing;
    a set of controls arranged within the control section of the front face of the housing; and
    a controller communicably connected to the touch screen display and each control of the set of controls, wherein the controller is operatively programmed to detect gesture commands entered by an operator through interaction with the touch screen display, and to detect operator interactions with the set of controls;
wherein:
    the processing device executes computer code that implements a set of widgets viewable on the touch screen display, the set of widgets organized to define:
        a motion home screen position that displays at least one travel related widget; and
        a lift home screen position that displays at least one lift related widget;
    wherein, when installed on an industrial vehicle:
        when a current operating state of a traction control module of the industrial vehicle indicates that a traction control is engaged, the controller causes the display to snap to the motion home screen position; and when a current operating state of a hydraulic module of the industrial vehicle indicates that forks are engaged in a lift operation on the industrial vehicle, the controller causes the display to snap to the lift home screen position.

2. The processing device of claim 1, wherein:
the set of controls and the touch screen display are implemented on a service component that is field replaceable;
the controller is implemented on a main component; and
the service component mounts to the main component.

3. The processing device of claim 1, wherein:
a first swipe gesture command implemented on the touch screen display and operation of a first control in the set of controls designated as a right control both map to a first graphical user interface command;
a second swipe gesture command implemented on the touch screen display and operation of a second control in the set of controls designated as a left control both map to a second graphical user interface command; and
a select gesture command implemented on the touch screen display and operation of a third control in the set of controls designated as a select control both map to a third graphical user interface command.

4. The processing device of claim 3, wherein:
the first control is implemented as a first button assigned to the right control;
the second control is implemented as a second button assigned to the left control; and
the third control is implemented as a third button assigned to the select control.

5. The processing device of claim 1, wherein:
the touch screen display graphically displays:
a widget space for displaying a select one of the set of widgets comprising a visual representation of a current state of an associated component of the industrial vehicle; and
the controller is further operatively programmed to extract the current state of the associated component of the industrial vehicle by communicating with at least one electronic component across the vehicle network bus.

6. The processing device of claim 5, wherein the touch screen display further graphically displays:
a menu selection section; and
a docked status tray that graphically displays at least one icon, each icon representing the current state of a vehicle component;
wherein the controller is further operatively programmed to periodically extract the current state of each vehicle component associated with an icon in the docked status tray by submitting a query across the vehicle network bus to at least one industrial vehicle electronic component.

7. The processing device of claim 5, wherein the widget space displays the current state of at least one of battery charge, vehicle speed, or fork lift height.

8. The processing device of claim 5, wherein the controller is further operatively programmed to receive information from another component of the industrial vehicle, and interact with the touch screen display to cause the widget space to display the current state of at least one of:
environmental state;
a task-based state reflecting the level of completion of the task; and
a count of the frequency and/or duration of correct warehouse operational behavior events in-between incorrect behavior events.

9. The processing device of claim 5, wherein the controller is further operatively programmed to receive information from another component of the industrial vehicle, and interact with the touch screen display to cause the widget space to be temporarily interrupted to display a message across a select one of:
a lower portion of the widget space that is removed after a period of time;
a single widget space that is removed after a period of time; or
the entirety of all displayed widget spaces for a period of time.

10. The processing device of claim 5, wherein:
the controller is further operatively programmed to receive information from another component of the industrial vehicle, and interact with the touch screen display to cause the widget space to be temporarily interrupted to display a message that is removed after a period of time; and
the controller is operatively programmed to clear the displayed message after any one of:
the vehicle operator presses a designated area of the touch screen, a button in the vehicle operator control area, or a combination thereof;
the message times out;
the message is cleared to display a higher priority message; or
the message is cleared to clear the display screen based upon a designated operating characteristic of the vehicle.

11. A processing device having a graphical user interface, the processing device comprising:
a housing having a front face, the front face defining a control section and a display section;
a touch screen display within the display section of the front face of the housing;
a set of controls arranged within the control section of the front face of the housing; and
a controller communicably connected to the touch screen display and each control of the set of controls, wherein the controller is operatively programmed to detect gesture commands entered by an operator through interaction with the touch screen display, and to detect operator interactions with the set of controls;
wherein when installed on an industrial vehicle:
the processing device executes computer code that implements a set of widgets, each widget representing live data representing a current state associated with the industrial vehicle or a vehicle operator, the set of widgets organized to define a motion home screen position that displays at least one relevant travel related widget;
when the industrial vehicle is stopped, a vehicle operator can navigate through graphical representations of the set of widgets on the display using any combination of the gesture commands and the set of controls; and
when a current operating state of a traction control module indicates that a traction control is engaged, the controller causes the display to snap to the motion home screen position.

12. The processing device of claim 11, wherein:
the touch screen display graphically displays:
    a widget space for displaying a select one of the set of widgets comprising a visual representation of at least one of battery charge, vehicle speed, or fork lift height;
    a menu selection section; and
    a docked status tray that graphically displays at least one icon, each icon representing the current state of a vehicle component;
    wherein:
        the controller is further operatively programmed to periodically extract the current state of each vehicle component associated with an icon in the docked status tray by submitting a query across the vehicle network bus to at least one industrial vehicle electronic component.

13. The processing device of claim 12, wherein the controller is further operatively programmed to interact with the touch screen display to cause the widget space to display a current state of at least one of:
    an environmental state;
    a task-based state reflecting the level of completion of the task; and
    a count of the frequency and/or duration of correct warehouse operational behavior events in-between incorrect behavior events.

14. The processing device of claim 12, wherein the controller is further operatively programmed to receive information from another component of the industrial vehicle, and interact with the touch screen display to cause the widget space to be temporarily interrupted to display a message across a select one of:
    a lower portion of the widget space that is removed after a period of time;
    a single widget space that is removed after a period of time; or
    the entirety of all displayed widget spaces for a period of time.

15. The processing device of claim 11, wherein:
    the set of controls and the touch screen display are implemented on a service component that is field replaceable;
    the controller is mounted to a main component;
    the service component mates to the main component to define the housing;
    a right swipe gesture command implemented on the touch screen display and operation of a first control in the set of controls both map to a first graphical user interface command;
    a left swipe gesture command implemented on the touch screen display and operation of a second control in the set of controls both map to a second graphical user interface command; and
    a select gesture command implemented on the touch screen display and operation of a third control in the set of controls designated as a select control both map to a third graphical user interface command.

16. A processing device having a graphical user interface, the processing device comprising:
    a housing having a front face, the front face defining a control section and a display section;
    a touch screen display within the display section of the front face of the housing;
    a set of controls arranged within the control section of the front face of the housing; and
    a controller communicably connected to the touch screen display and each control of the set of controls, wherein the controller is operatively programmed to detect gesture commands entered by an operator through interaction with the touch screen display, and to detect operator interactions with the set of controls;
    wherein when installed on an industrial vehicle:
        the processing device executes computer code that implements a set of widgets, each widget representing live data representing a current state associated with the vehicle or a vehicle operator, the set of widgets organized to define a lift home screen position that displays at least one relevant lift related widget;
        when the industrial vehicle is stopped, a vehicle operator can navigate through graphical representations of the set of widgets on the display using any combination of the gesture commands and the set of controls; and
        when a current operating state of a hydraulic module indicates that forks are engaged in a lift operation on the industrial vehicle, the controller causes the display to snap to the lift home screen position.

17. The processing device of claim 16, wherein:
the touch screen display graphically displays:
    a widget space for displaying a select one of the set of widgets comprising a visual representation of at least one of battery charge, vehicle speed, or fork lift height;
    a menu selection section; and
    a docked status tray that graphically displays at least one icon, each icon representing the current state of a vehicle component;
    wherein:
        the controller is further operatively programmed to periodically extract the current state of each vehicle component associated with an icon in the docked status tray by submitting a query across the vehicle network bus to at least one industrial vehicle electronic component.

18. The processing device of claim 17, wherein the controller is further operatively programmed to interact with the touch screen display to cause the widget space to display a current state of at least one of:
    an environmental state;
    a task-based state reflecting the level of completion of the task; and
    a count of the frequency and/or duration of correct warehouse operational behavior events in-between incorrect behavior events.

19. The processing device of claim 17, wherein the controller is further operatively programmed to receive information from another component of the industrial vehicle, and interact with the touch screen display to cause the widget space to be temporarily interrupted to display a message across a select one of:
    a lower portion of the widget space that is removed after a period of time;
    a single widget space that is removed after a period of time; or
    the entirety of all displayed widget spaces for a period of time.

20. The processing device of claim 16, wherein:
    the set of controls and the touch screen display are implemented on a service component that is field replaceable;
    the controller is mounted to a main component;
    the service component mates to the main component to define the housing;

a right swipe gesture command implemented on the touch screen display and operation of a first control in the set of controls both map to a first graphical user interface command;

a left swipe gesture command implemented on the touch screen display and operation of a second control in the set of controls both map to a second graphical user interface command; and a select gesture command implemented on the touch screen display and operation of a third control in the set of controls designated as a select control both map to a third graphical user interface command.

\* \* \* \* \*